US012762429B2

(12) United States Patent
Subramaniyan

(10) Patent No.: US 12,762,429 B2
(45) Date of Patent: Oct. 13, 2026

(54) ROBUST EXPLAINABLE ARTIFICIAL INTELLIGENCE

(71) Applicant: Articul8 AI, Inc., Santa Clara, CA (US)

(72) Inventor: Arun Karthi Subramaniyan, Santa Clara, CA (US)

(73) Assignee: Articul8 AI, Inc., Santa Clara, CA (US)

( * ) Notice: Subject to any disclaimer, the term of this patent is extended or adjusted under 35 U.S.C. 154(b) by 0 days.

(21) Appl. No.: 19/383,535

(22) Filed: Nov. 7, 2025

(65) Prior Publication Data

US 2026/0134293 A1 May 14, 2026

Related U.S. Application Data

(60) Provisional application No. 63/718,400, filed on Nov. 8, 2024.

(51) Int. Cl.

| | |
|---|---|
| ***G06N 3/098*** | (2023.01) |
| ***G06F 40/205*** | (2020.01) |
| ***G06F 40/284*** | (2020.01) |
| ***G06N 3/045*** | (2023.01) |
| ***G06N 3/0985*** | (2023.01) |

(52) U.S. Cl.

CPC ......... *G06N 3/0985* (2023.01); *G06F 40/205* (2020.01); *G06F 40/284* (2020.01); *G06N 3/045* (2023.01)

(58) Field of Classification Search

CPC ..... G06N 3/0985; G06N 3/045; G06F 40/284
See application file for complete search history.

(56) References Cited

U.S. PATENT DOCUMENTS

| | | | |
|---|---|---|---|
| 8,819,620 | B1 | 8/2014 | Volchegursky et al. |
| 2021/0117618 | A1 | 4/2021 | Mishra et al. |
| 2021/0141616 | A1 | 5/2021 | Kane |
| 2022/0100955 | A1 | 3/2022 | Law et al. |
| 2023/0084688 | A1 | 3/2023 | Rodrigo Cavalin et al. |

(Continued)

FOREIGN PATENT DOCUMENTS

| | | |
|---|---|---|
| CN | 116483970 A | 7/2023 |

OTHER PUBLICATIONS

Guo, "Gaussian Transformer: A Lightweight Approach for Natural Language Inference" (Year: 2019).*

(Continued)

*Primary Examiner* — Van C Mang
(74) *Attorney, Agent, or Firm* — Pillsbury Winthrop Shaw Pittman LLP

(57) ABSTRACT

Provided is process, including: a parsing a sequence of tokens from natural-language text; computing, with a transformer encoder of a neural network, a feature vector of the sequence of tokens; inputting the feature vector into a probabilistic head of the neural network comprising a Gaussian-process layer and determining, with the probabilistic head, both a latent mean and a latent variance for each of a plurality of candidate output classes; computing, with the probabilistic head, predictive class probabilities from the latent means and latent variances; selecting, with the neural network, one of the candidate output classes based on the predictive class probabilities; and determining an uncertainty of the selection based on the latent means and the latent variances.

20 Claims, 3 Drawing Sheets

(56) References Cited

U.S. PATENT DOCUMENTS

| | | | |
|---|---|---|---|
| 2023/0230198 | A1 | 7/2023 | Zhang et al. |
| 2024/0054035 | A1 | 2/2024 | Bhargav |
| 2024/0086757 | A1 | 3/2024 | Pei et al. |

OTHER PUBLICATIONS

Hugh, "Deep Gaussian Processes with Importance-Weighted Variational Inference" (Year: 2019).*

Masegosa, "Probabilistic Models with Deep Neural Networks", 2021 (Year: 2021).*

Depeweg, "Uncertainty Decomposition in Bayesian Neural Networks with Latent Variables", 2017 (Year: 2017).*

Wilson, Andrew Gordon et al., Deep Kernel Learning, Appearing in Proceedings of the 19th International Conference on Artificial Intelligence and Statistics (AISTATS) 2016, pp. 370-378.

Liu, Jeremiah Zhe et al., Simple and Principled Uncertainty Estimation with Deterministic Deep Learning via Distance Awareness, Oct. 26, 2020, pp. 1-25.

Hensman, James et al., Scalable Variational Gaussian Process Classification, Appearing in Proceedings of the 18th International Con•ference on Artificial Intelligence and Statistics (AISTATS) 2015, pp. 351-360.

Gal, Yarin et al., Dropout as a Bayesian Approximation: Representing Model Uncertainty in Deep Learning, Jun. 6, 2015, pp. 1-4.

I.M. Sobol, Global sensitivity indices for nonlinear mathematical models and their Monte Carlo estimates, Mathematics and Computers in Simulation 55 (2001), pp. 271-280.

International Search Report and Written Opinion for Application No. PCT/US2025/054698 dated Mar. 19, 2026, pp. 1-10.

Jiaxiang Hu et al., 'Probabilistic net load forecasting based on transformer network and Gaussian process-enabled residual modeling learning method', Renewable Energy, vol. 225, Mar. 3, 2024, pp. 2-6, 8.

S. Sreekumar et al., 'Aggregated Net-load Forecasting using Markov-Chain Monte-Carlo Regression and C-vine copula', Applied Energy, vol. 328, Oct. 30, 2022, p. 4.

Thomas Fel et al., 'Look at the Variance! Efficient Black-box Explanations with Sobol-based Sensitivity Analysis', 35th Conference on Neural Information Processing Systems (NeurIPS 2021), Dec 6, 2021, p. 2; and figure 1.

David Kappel et al., 'Block-local learning with probabilistic latent representations', 37th Conference on Neural Information Processing Systems (NeurIPS 2023), Dec 13, 2023, pp. 3-4; and figure 2.

International Search Report and Written Opinion for Application No. PCT/US2025/054699 dated Mar. 26, 2026, pp. 1-10.

Mingyue Yuan et al., 'MAxPrototyper: A Multi-Agent Generation System for Interactive User Interface Prototyping', arXiv:2405.07131 vl, May 2024.

International Search Report and Written Opinion for Application No. PCT/US2025/054697 dated Mar. 19, 2026, pp. 1-10.

Zixuan Huang et al., 'Style Mixer: Semantic-aware Multi-Style Transfer Network', Computer Graphics forum, vol. 38, Issue 7, Nov. 14, 2019.

* cited by examiner

ROBUST EXPLAINABLE ARTIFICIAL INTELLIGENCE

CROSS-REFERENCE TO RELATED APPLICATIONS

This patent claims the benefit of U.S. Provisional Patent Application 63/718,400, filed Nov. 8, 2024, titled ROBUST EXPERT EXPLAINABLE GENERATIVE AI. The entire content of each afore-listed earlier-filed application is hereby incorporated by reference for all purposes.

BACKGROUND

1. Field

The present disclosure relates generally to artificial intelligence (AI) and, more specifically, to robust explainable AI.

2. Description of the Related Art

Artificial intelligence (AI) is used to automate and optimize various processes, such as data analysis, inventory management, quality control, predictive maintenance, and content generation. For instance, AI (a term used to also include machine learning) systems may analyze large datasets to identify patterns and trends, which may allow for more informed decision-making regarding product development, resource allocation, and financial forecasting. Machine learning algorithms may process historical and real-time data to predict demand fluctuations, optimize supply chains, and identify potential equipment failures before they occur, potentially reducing downtime and costs. Generative artificial intelligence models, such as those for text, image, or code generation, may support creative tasks by producing design concepts, drafting documents, or generating synthetic data for training purposes. Additionally, some companies may use artificial intelligence for fraud detection, regulatory compliance, monitoring transactions and system behaviors to flag anomalies that may indicate suspicious activity, among many other use cases.

SUMMARY

The following is a non-exhaustive listing of some aspects of the present techniques. These and other aspects are described in the following disclosure.

Some aspects include a process, including: a parsing a sequence of tokens from natural-language text; computing, with a transformer encoder of a neural network, a feature vector of the sequence of tokens; inputting the feature vector into a probabilistic head of the neural network comprising a Gaussian-process layer and determining, with the probabilistic head, both a latent mean and a latent variance for each of a plurality of candidate output classes; computing, with the probabilistic head, predictive class probabilities from the latent means and latent variances; selecting, with the neural network, one of the candidate output classes based on the predictive class probabilities; and determining an uncertainty of the selection based on the latent means and the latent variances.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
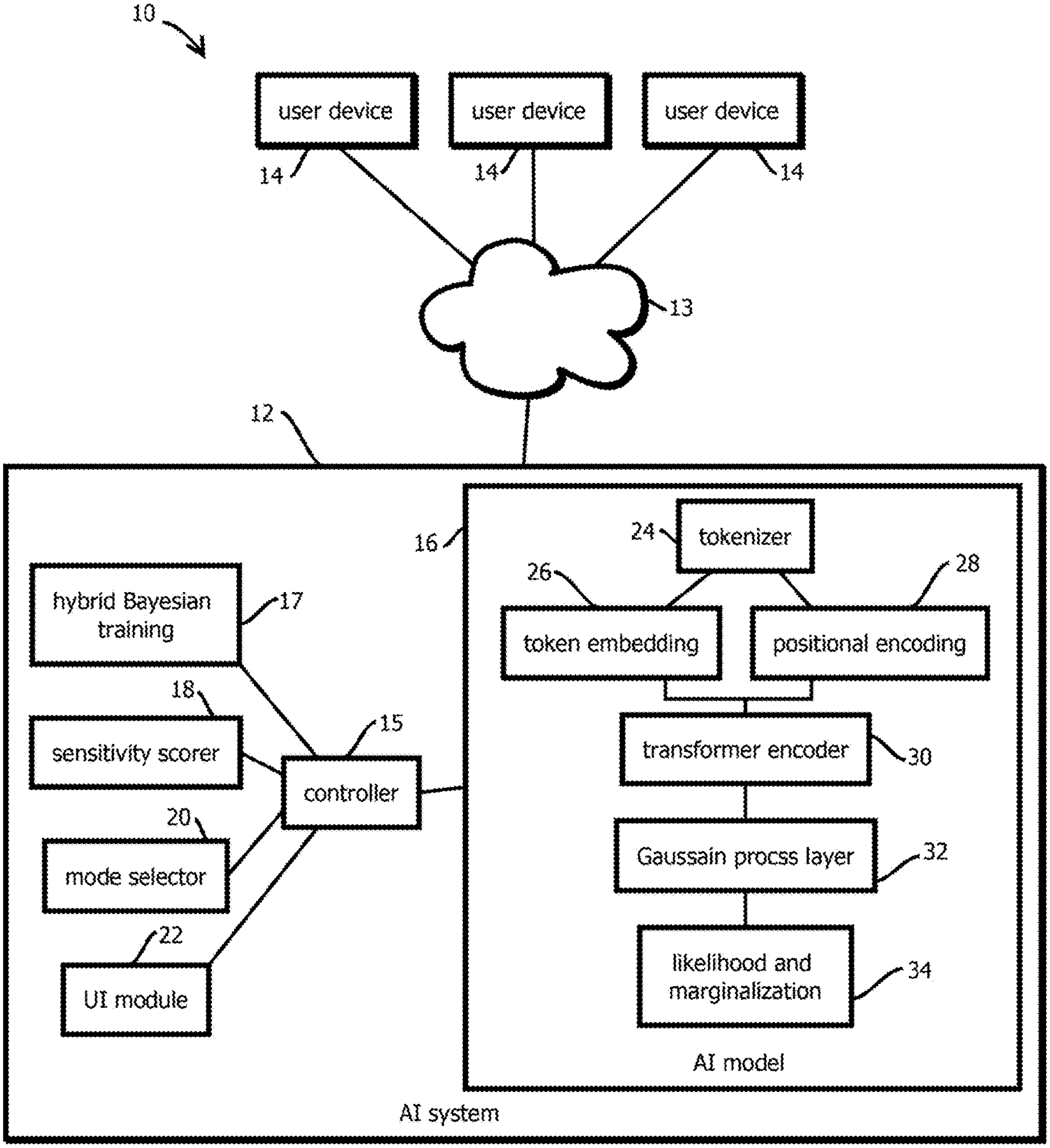
FIG. 1 is a block diagram illustrating an example of an AI system in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many AI models, including generative artificial intelligence models and systems such as transformer-based architectures, generate complex predictions without incorporating mechanisms for quantifying uncertainty or providing interpretability. Many existing approaches produce deterministic outputs, often offering limited insight into confidence levels or the influence of specific features on the prediction. This constraint presents challenges in applications where understanding factors influencing predictions is expected to enhance reliability. Furthermore, while certain traditional methods may generate probabilistic outputs, such methods often involve intensive computational demands and do not integrate seamlessly with transformer architectures in high-dimensional and scalable task environments. Accordingly, there is a need for a computer system that combines the strengths of probabilistic reasoning, uncertainty quantification, and interpretability in a computationally feasible manner, which is not to suggest that embodiments are limited to systems addressing all of these issues or any of these issues.

None of the preceding should be read to imply that any approach is disclaimed or disavowed, and this clarification should not be read to imply that any other material is disclaimed or disavowed herein where no such clarification is provided. Further, the discussion of various issues with other approaches herein should not be read to imply that embodiments are limited to systems that fully solve, or even mitigate, all of these issues or any of these issues, which is not to imply that any other description is limiting.

In some embodiments, a hybrid computing architecture may combine Gaussian Processes, transformer models, Bayesian training through Markov Chain Monte Carlo, and Sobol sensitivity analysis to enhance interpretability and uncertainty quantification. This architecture may be specifically configured to address computational and interpretability constraints observed in other models, rendering it suitable for complex, high-dimensional tasks.

Example embodiments may mitigate some or all of these problems or other problems and have the following features.

Some embodiments include a hybrid probabilistic system architecture that includes a fusion of Gaussian Processes and transformer models, with adaptive uncertainty layers designed to adjust probabilistic outputs based on input data complexity. These adaptive Gaussian Process layers may modulate their influence within the network, dynamically scaling uncertainty measures for complex inputs while conserving computational resources for simpler data, allowing the system to operate effectively across varied data types and complexities. This dynamic adjustment of uncertainty contributions may distinguish the system from models using static probabilistic layers, providing a more efficient response to differing data demands (which is not to suggest that embodiments are limited to systems having this feature.)

In some embodiments, the Gaussian Process component may serve as a probabilistic layer within a deep neural network, estimating the likelihood of various potential predictions. This probabilistic estimation may support robust uncertainty modeling, addressing scenarios where deterministic models may not quantify prediction uncertainty effectively.

To further enhance the integration of Gaussian Processes within the transformer architecture, some embodiments may include a structured sparse attention mechanism. This mechanism may prioritize high-variance regions within the input data, directing computational resources toward critical data segments. By allocating attention to these high-impact regions, the system may optimize uncertainty estimation, setting it apart from typical transformer architectures that lack targeted sparsity in their attention mechanisms, particularly in uncertainty-focused applications.

Certain embodiments may draw on biological analogies, where organisms make critical decisions with incomplete information, utilizing probabilistic reasoning in response to uncertain and changing conditions. For instance, biological systems, such as the nervous system, may operate on partial sensory data to make probabilistic predictions guiding behavior. In alignment with this principle, the system may integrate Gaussian Processes within the transformer architecture to explicitly quantify uncertainty. Similar to biological systems that assess and respond to varying certainty levels, this architecture may provide confidence metrics alongside predictions, supporting informed decision-making even with limited or noisy data.

In some embodiments, an enhanced Bayesian training system may be implemented with optimized Markov Chain Monte Carlo (MCMC) sampling techniques, featuring adaptive adjustments to chain length based on parameter convergence. In some forms of MCMC-based training, computational demands may increase significantly with extensive sampling. To address this, some embodiments may use adaptive stopping conditions, modifying the chain length for each parameter according to convergence criteria. This adaptation, in some embodiments, allows for high-fidelity Bayesian inference without redundant sampling, potentially reducing computation time and enabling scalable performance in large-scale applications where exhaustive MCMC sampling might otherwise be impractical (which is not to suggest that this approach is disclaimed).

The architecture may also employ hierarchical parameter sampling rather than a flat MCMC approach. In some embodiments, higher-level system parameters may be sampled initially, followed by lower-level parameters conditioned on these broader distributions. This hierarchical strategy may accelerate convergence of critical structural parameters, facilitating efficient sampling within complex model architectures by focusing computational resources on parameters that contribute most significantly to system performance.

In some embodiments, a design inspired by biological processes may inform the adaptive mechanisms within the Bayesian inference process. Biological systems frequently prioritize responses based on situational demands; for example, the immune system may dynamically amplify responses to high-priority pathogens while conserving energy in low-risk situations. Reflecting this principle, the adaptive MCMC chain length and hierarchical sampling mechanisms may selectively apply Bayesian inference to predictions of higher priority, conserving computational resources for scenarios requiring enhanced accuracy. This selective prioritization may allow the model to operate responsively and efficiently, mirroring the energy-efficient strategies observed in biological systems.

In some embodiments, a hybrid optimization mechanism may incorporate Stochastic Gradient-Based Bayesian Inference (SGBI) to facilitate efficient training by combining MCMC sampling with gradient-based parameter updates. The SGBI component may use mini-batch gradients to accelerate parameter updates, enhancing scalability for Bayesian training. This hybrid approach may provide a balance between the exploration facilitated by MCMC sampling and the efficiency of gradient-based updates, offering a potential improvement over methods that rely solely on MCMC or gradient optimization.

To manage computational complexity, the architecture may include optimized MCMC sampling methods alongside quasi-Monte Carlo techniques, allowing it to scale Bayesian inference effectively within high-dimensional parameter spaces. This scaling may balance computational feasibility with high-quality uncertainty estimation, enabling the system to maintain robustness in complex tasks.

In some embodiments, the system may employ probabilistic regularization by integrating dropout-inspired priors within Gaussian Process-transformer layers. This dropout-based regularization technique may simulate the effects of multiple posterior distributions, smoothing the posterior landscape and producing a broader array of MCMC samples for uncertainty analysis. By introducing variability into the model's response, this probabilistic regularization may reduce the risk of overfitting and increase adaptability to new data, strengthening the system's performance in dynamic environments.

The system architecture may also reflect principles inspired by hierarchical organization observed in biological networks, where different levels of processing allow for efficient resource allocation. For instance, the brain processes sensory input in stages, moving from basic feature detection to complex pattern recognition, with specialized pathways dedicated to handling high-priority signals. In some embodiments, the system may incorporate a Hierarchical Parameter Sampling method within the MCMC training process, whereby high-level parameters converge quickly, allowing for focused refinement of lower-level parameters only when necessary. This staged processing may contribute to resource efficiency by directing computational resources to critical tasks, emulating the selective allocation seen in biological systems.

In some embodiments, enhanced explainability may be achieved through mechanisms for variance detection and topological attribution. The system may apply Sobol sensitivity analysis with multi-level feature grouping, allowing related features, such as linguistic constructs, semantic clusters, or syntactical patterns, to be grouped and analyzed for their collective impact on prediction variance. By organizing features into multi-level groups, the system may provide insights into how broader feature categories, such as technical terminology versus colloquial language, influence overall uncertainty, offering interpretability at both granular and grouped levels.

The system may further include a Variance Attribution Mapping (VAM) module that generates visual explanations of feature contributions to predictive variance. This module may create heatmap-style visualizations, highlighting influential feature groups and interaction effects as determined through Sobol indices. Sensitivity-layered visual explanations may help users intuitively grasp the significance of individual features and grouped interactions, enhancing the interpretability of system predictions in decision-critical applications.

To capture feature relationships within a topological network, the system may use a graph-based clustering technique for topological variance detection. This network may organize features into clusters that reflect their structural relationships, such as phrase structures, thematic groupings, or cross-domain terms. By analyzing clusters and attributing variance to each, this topological approach may reveal feature neighborhoods in which similar features collectively influence prediction uncertainty.

Building on VAM, the topological variance detection module may produce a topological heatmap, displaying clusters as connected nodes with edge thickness representing inter-cluster interactions. Nodes may be color-coded according to variance levels, providing a visual trace of feature clusters or network "hotspots" that contribute substantially to predictive uncertainty. This approach may reveal interconnected feature structures affecting system predictions beyond isolated features, offering a holistic view of feature interactions.

For adaptability, the system may employ adaptive node clustering and real-time variance tracking, allowing topological clustering to update in real time as new data arrives. Node and edge representations may adjust dynamically, reflecting variance shifts due to evolving input features. This real-time tracking may enable users to observe how predictive uncertainty changes in response to new data characteristics.

The system may also offer comparative analysis across multiple topological layers, enabling users to view variance contributions at various levels, from fine-grained feature nodes to aggregated cluster layers. This layered comparative capability may assist domain experts in pinpointing the sources of variance and tracing them through different topological levels, yielding a comprehensive perspective on variance across feature hierarchies.

To maintain computational efficiency, low-discrepancy sampling techniques, such as Sobol sequences, may be applied to ensure sensitivity analysis remains feasible even in high-dimensional settings, supporting deployment in real-world applications without incurring prohibitive computational costs.

In some embodiments, biological analogies may inform the system's design. Biological systems, such as the visual processing pathways in the brain, frequently process information across multiple hierarchical layers, from initial feature detection to complex pattern recognition, to arrive at holistic interpretations. Reflecting this multi-layered approach, the model may use Sobol Sensitivity Analysis with Multi-Level Feature Grouping to decompose complex predictions into understandable parts, providing insights into individual features and group interactions, in a manner similar to how the brain integrates signals across multiple layers for robust perception.

In some embodiments, an adaptive sensitivity-driven inference mode selection mechanism may be incorporated to dynamically adjust inference modes based on real-time sensitivity analysis of input features. For features identified as high-sensitivity—those with a significant influence on prediction variance—the model may switch to full Bayesian inference, which may maximize interpretability by generating a richer probabilistic output. Conversely, for low-sensitivity features, the model may use faster, deterministic inference to enhance computational efficiency while preserving interpretability.

The system may also include a real-time sensitivity threshold calibration mechanism that adjusts sensitivity thresholds based on recent inference patterns. For example, if specific features repeatedly demonstrate low sensitivity, the threshold may adaptively adjust to reduce computational demands associated with those inputs. This continuous feedback system allows the model to optimize resource allocation dynamically, supporting adaptability in environments where data profiles may shift frequently.

In some embodiments, the design of the adaptive sensitivity-driven inference mechanism may draw on biological analogies. Living organisms frequently adjust responses based on input sensitivity and feedback from their environment; for instance, sensory adaptation allows humans to focus on important or novel stimuli while filtering out background information, thereby conserving cognitive resources. Like this principle, the sensitivity-driven inference mode selection and real-time sensitivity threshold calibration mechanisms may enable the system to adjust its inference strategy according to input sensitivity. This dynamic calibration may allow the model to prioritize high-impact inputs, optimizing computational resources by minimizing processing for low-sensitivity features, in a manner similar to how biological systems allocate attention and resources to critical stimuli.

Some embodiments may offer several expected benefits of topological variance detection and attribution. By mapping predictive variance across a topological network of features, this approach may provide holistic interpretability, giving a comprehensive view of feature interactions and their cumulative impact on uncertainty. Such a global perspective may be especially useful in applications involving interrelated variables or complex, multifaceted feature relationships. The topological heatmap, which visually highlights high-variance clusters and interdependencies, may offer enhanced visual clarity, allowing users to intuitively understand the factors influencing system uncertainty. This visual transparency may assist users in interpreting intricate, interconnected features, contributing to increased confidence in the system's reliability. Further, with adaptive clustering and real-time variance tracking, users may observe how predictive uncertainty shifts in response to incoming data, rendering this approach suitable for dynamic environments with evolving data distributions or changing prediction patterns.

The technical implementation may provide advantages related to probabilistic prediction, Bayesian inference, and sensitivity-driven interpretability. By incorporating Gaussian Processes within the transformer architecture, the system may generate probabilistic outputs that represent uncertainty associated with each prediction, a feature expected to be valuable in applications where interpretable confidence metrics are helpful. Bayesian inference via Markov Chain Monte Carlo (MCMC) may help the system to maintain a distribution over model parameters, offering deeper insights into parameter uncertainty and supporting robust generalization in out-of-sample scenarios. Furthermore, Sobol sensitivity analysis may be integrated within the Bayesian framework to provide interpretability by indicating how individual input features contribute to the system's probabilistic output, thereby enhancing user confidence in the model's predictions.

Some variations may include alternative sensitivity analysis approaches, sampling techniques, attention mechanisms, probabilistic layers, and adaptations for real-time applications. For sensitivity analysis, although Sobol sensitivity analysis may be used for its robust decomposition capabilities, other methods, such as variance-based approaches or Shapley values, may also be implemented to offer different interpretability perspectives. These alternative methods may be advantageous in specific domains where varying interpretability needs are present.

In terms of sampling, variants on Markov Chain Monte Carlo (MCMC), including variational inference or particle-based techniques, may achieve approximate Bayesian inference with reduced computational requirements. While these techniques may provide less precise Bayesian sampling, they may be valuable in settings with constrained computational resources.

Some embodiments may use kernelized attention mechanisms in place of traditional transformer attention, enhancing interpretability and enabling more selective feature sparsity. This adjustment may streamline the architecture and reduce computational demands, potentially making it more suitable for lightweight applications.

In instances where Gaussian Processes may introduce significant computational demands, other probabilistic models, such as Bayesian neural networks or probabilistic linear regression, may be substituted. Although these alternatives may offer less granular uncertainty quantification, they could serve as computationally lighter options, especially in resource-limited environments.

Additionally, adaptations may be made for real-time applications by adjusting sampling frequency or refining the scope of sensitivity analysis. In such cases, certain layers or analyses may be streamlined to emphasize speed over comprehensive uncertainty quantification. For example, using only first-order Sobol indices may allow for faster interpretability while still retaining insights.

In some embodiments, the present techniques may be integrated with systems and processes described in other patent applications by the applicant filed on the same day as this filing. Some embodiments may apply personas to shape model outputs with the techniques described in the U.S. patent application Ser. No. 19/383,524, titled CREATING CONTEXT-SPECIFIC, VERSATILE EXPERT AI PERSONAS. Some embodiments may provide a user interface with the techniques described in the U.S. patent application Ser. No. 19/383,537, titled HUMAN-AI CO-CREATION SYSTEM. The entire content of each afore-mentioned patent filing in this paragraph is hereby incorporated by reference.

It should be assumed that the results described herein are generally prophetic, rather that describing the result of actual tests performed.

In some embodiments, the above architecture may be implemented on one or more computing devices forming a computing system, e.g., a client-server architecture. Having memory storing instructions that when executed, implement the described functionality. In some embodiments, users may access this computing system via a network such as the internet. Remotely, using their own computing devices, which may be personal computers, desktop computers, wearable computing devices, laptop computers, and the like. In some embodiments, the described system may be implemented in a cloud architecture, in a hybrid cloud architecture, and on-premises architecture, or in other architectures. In some embodiments, an orchestrator module may coordinate the various models in the execution path, and a view generator may generate the user interfaces, which may be presented client-side in a special purpose application or in a web browser.

As shown in the block diagram of computing environment 10 of FIG. 1, and as described in more detail below, in some embodiments, an AI system 12 may implement some or all of the above techniques or related approaches. In some embodiments, one or more user devices 14 may communicate with the AI system 12 over the internet 13 to submit inputs, retrieve outputs, and initiate training or evaluation sessions.

In some embodiments, user devices 14 may be geographically distributed client systems that initiate network sessions with the AI system 12, and may operate under a single organization or under distinct tenant accounts associated with different organizations. A user device 14 may include one or more processors, volatile and non-volatile memory, a network interface supporting wired or wireless links, and local storage containing a client application and configuration data specifying tenant identifiers and endpoint addresses. A user device 14 may execute an operating system such as Windows™, macOS™, Linux™, Android™, or iOS™, and may provide clock synchronization, secure key storage, and certificate trust settings that may be referenced during authenticated sessions. A user device 14 may maintain local logs and may persist request identifiers and response artifacts to allow resubmission or later reconciliation.

In some embodiments, a user device 14 may interact with the AI system 12 through a web browser, a special-purpose native application, or a headless process that communicates via an application programming interface (API). A browser-based client may issue requests over a secure transport, may send authentication tokens scoped to a tenant account, and may transmit input payloads encoded as structured data such as JavaScript™ Object Notation (JSON) or a binary message format, while rendering response data and links returned by the AI system 12. A native application may establish a persistent session, may batch multiple inference or training-control requests, and may stream partial results to a display or file sink. An API client may run without human interaction, may execute as a background service on the user device 14, and may schedule calls to the AI system 12 based on local triggers, queued jobs, or a periodic timer. In some embodiments, a user device 14 may request inference by the AI system 12, view the result, and be used to interrogate data indicative of uncertainty in the response and factors contributing to that uncertainty, as described further below.

In some embodiments, the internet 13 may comprise packet-switched networks that route Internet Protocol version 4 or version 6 traffic across public and private links, and may instead or additionally include a private network such as an enterprise wide-area network connected through virtual private network tunnels, software-defined wide area networking, or dedicated circuits. The internet 13 may carry requests from user devices 14 to the AI system 12 over Transport Layer Security sessions, may resolve service endpoints through Domain Name System queries, and may traverse network address translation boundaries, firewalls, intrusion detection sensors, and proxy gateways that apply policy rules. The internet 13 may include cloud provider backbone segments and virtual private clouds that expose endpoints through load balancers and reverse proxies, and may pass traffic through peering exchanges and content routing layers that select paths based on latency measurements and health probes. The AI system 12 may be deployed in a public cloud tenancy, may be hosted on-premises within a data center rack, or may be arranged as a hybrid where control-plane services run in a cloud tenancy and data-plane services run on-premises, and the internet 13 may provide interconnection between these sites using encrypted tunnels, private peering links, or cross-connects that carry application programming interface calls, model artifacts, and telemetry streams under tenant scoping metadata.

In some embodiments, as described further below, the AI system 12 may include a controller 15 that may orchestrate data ingress, job scheduling, and inter-component messaging among an AI model 16, a hybrid Bayesian training module 17, a sensitivity scorer 18, a mode selector 20, and a user interface module 22. The controller 15 may receive requests, assign them identifiers, enqueue them to processing queues, and forward intermediate artifacts and parameter snapshots between components. The hybrid Bayesian training module 17 may run training and update procedures and may write parameter states to a repository that the controller 15 may reference when activating models for inference. The sensitivity scorer 18 may compute token- or group-level sensitivity signals from inputs and intermediate features and may publish those signals for consumption by the mode selector 20. The mode selector 20 may evaluate the sensitivity signals against one or more thresholds and may emit routing directives that the controller 15 may apply to choose between inference paths. The user interface module 22 may prepare response payloads, may render or serialize visualizations and logs, and may format outputs for delivery to user devices 14. The AI model 16 may process inputs and may produce classification scores and associated uncertainty values for use by the other components.

In some embodiments, the controller 15 may execute as one or more services that may expose APIs for receiving requests from user devices 14 and for coordinating the flow of data through the AI system 12. The controller 15 may assign request identifiers, may validate authentication tokens and tenant scope, and may record metadata such as timestamps, client attributes, and routing tags. The controller 15 may persist request envelopes, intermediate artifacts, and output records to a durable store, which may include a relational database for transactional state and an object store for larger payloads. The controller 15 may maintain a registry of active model versions and configuration parameters, and may select a model version for each request based on routing rules, tenant configuration, or an experiment assignment. The controller 15 may enqueue work items onto internal queues, may apply backpressure and rate limits, and may schedule execution on worker processes that interact with the AI model 16, the sensitivity scorer 18, and the mode selector 20.

In some embodiments, the controller 15 may implement a stateless request handler tier and a background orchestration tier. The request handler tier may deserialize inputs, may normalize text encoding, may attach tenant metadata, and may publish an inference task to a message queue, while returning an acknowledgment that includes the request identifier. The background orchestration tier may poll the queue, may fetch the associated configuration, and may submit a call to the AI model 16 for feature computation and candidate class scoring. The controller 15 may request sensitivity scores from the sensitivity scorer 18, may forward those scores to the mode selector 20, and may receive a directive that identifies an inference path. The controller 15 may execute the selected path, which may include additional sampling and marginalization steps or a deterministic evaluation, and may aggregate outputs into a response record that includes class probabilities, uncertainty values, and diagnostic fields. The controller 15 may apply idempotency checks based on the request identifier, may retry failed operations with bounded backoff, and may emit structured logs and metrics for later analysis.

In some embodiments, the controller 15 may execute a process described below with reference to FIG. 2. The controller 15 may initialize this process definition at startup, may refresh it from a configuration service, and may branch among steps according to status signals produced by downstream components. The controller 15 may update thresholds and routing rules at run time by consuming feedback streams that report latency, throughput, and calibration measurements, and may write the updated values to a configuration store for consistent consumption across services. The controller 15 may maintain secure connections to data stores and to the internet 13 endpoints, may rotate credentials according to tenant policy, and may verify message signatures where applicable. The controller 15 may also prepare artifacts for the user interface module 22, which may include compact summaries, references to stored visualizations, and links to audit logs, and may transmit those artifacts to user devices 14 after the response record is persisted. The controller 15 may direct inference and training operations of the AI model 16.

In some embodiments, at run time (as opposed to during prior training), the AI model 16 may receive tokenized text and associated metadata from the controller 15, may construct intermediate representations for the input, and may execute an inference pass that produces candidate class scores and uncertainty-related quantities for those candidates. The AI model 16 may accept a request context that specifies a model version, precision policy, and may branch accordingly to perform either a deterministic evaluation or a sequence that includes stochastic sampling and marginalization steps. The AI model 16 may process multiple inputs in a batch, may apply masking to account for variable-length sequences, and may emit outputs that include per-class predictive probabilities, an uncertainty value derived from the predictive distribution, and auxiliary diagnostics such as intermediate feature summaries and sensitivity signals when requested by the controller 15. The AI model 16 may expose service endpoints for synchronous calls and asynchronous jobs, may record timing and status markers for each stage of the pass, and may write structured artifacts to storage for later retrieval by the user interface module 22.

In some embodiments, as explained further below, the AI model 16 may compute per-output-class predictive distributions rather than single-point scores by applying a probabilistic head that may include a Gaussian process layer and a likelihood mapping with marginalization. For instance, the model 16 may classify as input sequence as belonging to one of a set of classes or as being followed by one of a set of classes or the like. The AI model 16 may draw latent samples or apply moment-matching to propagate uncertainty through the likelihood and may aggregate the resulting class probability vectors. The AI model 16 may also compute uncertainty measures determined from the predictive distribution, and may emit both the probability outputs and the uncertainty values as first-class results alongside intermediate artifacts requested by the controller 15. These operations may be performed under either a deterministic evaluation path or a stochastic path selected by the mode selector 20, and the same or other interfaces may be used during both training and inference.

In some embodiments, as explained further below, the AI model 16 may record feature sensitivities at token and group levels and may provide variance attribution signals determined from sampling traces or from auxiliary estimators. The AI model 16 may apply structured sparse attention masks that may be conditioned on sensitivity scores and may adjust computation budgets for blocks, heads, or layers based on thresholds received from the controller 15. The AI model 16 may expose programmatic hooks to generate visual attribution artifacts, such as heatmaps layered by sensitivity level and graphs that may summarize interactions among grouped features, and may write references to those artifacts to storage for later retrieval by the user interface module 22. These mechanisms are expected to provide clearer explanations of how inputs contribute to outputs and are expected to help with understanding which inputs contribute to higher or lower uncertainty during inference.

In some embodiments described further below, the AI model 16 may be trained with procedures that may combine stochastic gradient-based Bayesian updates with targeted Markov chain Monte Carlo steps over selected hyperparameters. The AI model 16 may apply adaptive stopping conditions for chains, may incorporate quasi-Monte Carlo sampling for variance reduction, and may apply probabilistic dropout priors that sample gating variables during forward and backward passes. The resulting parameter states may be checkpointed with metadata recording sampler settings and effective sample counts, and the inference path may marginalize over posterior samples or variational parameters to produce outputs. These operations are expected to improve calibration of the predictive distribution in settings where high accuracy and clear communication of uncertainty are needed, and are expected to allow downstream systems to apply risk-aware decision rules based on the provided uncertainty values.

In some embodiments elaborated upon below, the AI model 16 may include a tokenizer 24 that may segment input strings (or other sequences of symbols) into tokens according to a subword or wordpiece scheme and may output token identifiers and masks, a token embedding module 26 that may map token identifiers to dense vectors stored in a table and may emit a sequence of embedding vectors, and a positional encoding module 28 that may combine positional information with the embedding vectors by adding, concatenating, or otherwise injecting a position-dependent signal. A transformer encoder 30 may consume the position-conditioned vectors and may compute contextual representations across the token sequence using attention and feed-forward operations, and may output hidden states that may be pooled or otherwise summarized. A Gaussian-process layer 32 may receive a pooled representation and may compute class-wise latent quantities that may include measures of central tendency and dispersion for downstream use. A likelihood and marginalization module 34 may map the latent quantities to class probabilities according to a selected likelihood, may average or otherwise combine results across sampled or approximated latent values, and may emit probability vectors and uncertainty values for use by other components.

In some embodiments, the tokenizer 24 may receive an input payload that may include raw text, markup such as HyperText Markup Language (HTML), structured records such as JSON, or newline-delimited logs, and may produce a sequence of token identifiers and associated masks for use by downstream components. The tokenizer 24 may apply canonicalization steps that may include Unicode normalization, script detection, case folding subject to configuration, and whitespace collapsing while preserving code point offsets that may support later alignment to the original input. The tokenizer 24 may segment the normalized stream into initial units such as words, punctuation, and numeric spans, and may further segment those units into subword fragments according to a stored vocabulary and a set of merge or split rules. The tokenizer 24 may output token identifiers, an attention mask that may distinguish padding from content, optional type identifiers that may distinguish segments, and position indexes that may be consumed by the token embedding module 26 and the positional encoding module 28.

In some embodiments, the tokenizer 24 may implement a rule-driven subword procedure that may begin with a character or byte sequence, may apply a sequence of merges that may combine adjacent fragments that appear in a learned vocabulary, and may stop merging when no higher-priority rule applies. In other embodiments, the tokenizer 24 may implement a probabilistic segmentation procedure that may score candidate segmentations and may select a sequence according to stored scores, while falling back to byte-level fragments when an input substring is not present in the vocabulary. The tokenizer 24 may maintain a table of special tokens that may include classification markers, separators, padding markers, unknown markers, and user-defined control symbols, and may insert those tokens based on configuration or explicit markup in the input. The tokenizer 24 may support detokenization by storing span boundaries and may expose offsets that may allow the user interface module 22 to highlight tokens or groups of tokens in visual artifacts.

In some embodiments, the tokenizer 24 may process multilingual inputs by first applying language and script identification, may select a vocabulary associated with the detected language or a shared multilingual vocabulary, and may apply language-specific normalization such as diacritic handling or punctuation folding. For structured inputs, the tokenizer 24 may offer modes that may retain or discard syntactic delimiters and field names; for example, a structured-record mode may treat keys and values as separate token streams and may emit segment identifiers so that downstream components may distinguish among fields. For markup, the tokenizer 24 may include a mode that may strip tags while retaining text content, and another mode that may map tags and attributes to special tokens to preserve layout cues. For code inputs, the tokenizer 24 may expose a lexical mode that may treat identifiers, string literals, and operators as separate categories and may retain formatting characters that may convey block structure.

In some embodiments, non-text modalities may be provided as text-like inputs to the tokenizer 24 after preprocessing performed by other components. For example, an audio stream may be transcribed to text prior to tokenization and an image may be converted to text through optical character recognition prior to tokenization. Or embodiments may use a tokenizer for a vision transformer. The tokenizer 24 may then apply the same segmentation procedures and may record provenance metadata indicating the upstream conversion. The tokenizer 24 may support batch and streaming operation. In streaming operation, the tokenizer 24 may emit tokens incrementally as new input bytes arrive, may maintain partial-fragment state across boundaries, and may flush or resegment when a later substring causes a different merge choice under the segmentation rules. The tokenizer 24 may apply length constraints that may include truncation and padding to a target sequence length, and may record the extent of truncation so that the controller 15 may request a continuation pass if needed.

In some embodiments, the tokenizer 24 may maintain tenant-scoped vocabularies and configuration profiles so that different organizations may apply distinct segmentation policies. The tokenizer 24 may support dynamic vocabulary updates by loading additional merge rules or special tokens at runtime and may version those updates so that inference requests may reference a particular configuration. The tokenizer 24 may implement security checks that may include redaction of specified patterns, quarantine of oversized or malformed inputs, and normalization of bidirectional control characters. The tokenizer 24 may expose diagnostics that may include token counts, out-of-vocabulary rates, and per-category histograms, and may write these diagnostics to logs referenced by the controller 15. The tokenizer 24 may be implemented as a library linked into the AI model 16 process, as a microservice with a remote procedure call interface, or as a plug-in to the user device 14 client application, and may use a memory-mapped vocabulary file or an in-memory tries to accelerate segmentation.

In some embodiments, the tokenizer 24 may output a structured record that may include, for a sequence length L, an array of token identifiers of length L, a parallel attention mask of length L indicating content or padding positions, optional segment type identifiers of length L, position indexes of length L, and character or byte offsets mapping each token back to the source string; for example, given the input text "Reset my password, please." and a maximum length of 12, the tokenizer 24 may emit token identifiers such as [101, 12287, 602, 4219, 117, 7335, 102, 0, 0, 0, 0, 0] where 101 may denote a classification marker, 102 may denote a separator marker, 0 values may denote padding, and intervening values may denote subword units for "Reset," "my," "password," "," and "please," respectively; an attention mask such as [1, 1, 1, 1, 1, 1, 1, 0, 0, 0, 0, 0]; segment type identifiers such as [0, 0, 0, 0, 0, 0, 0, 0, 0, 0, 0, 0]; position indexes such as [0, 1, 2, 3, 4, 5, 6, 7, 8, 9, 10, 11]; and offsets such as [(0, 0), (0, 5), (6, 8), (9, 17), (17, 18), (19, 25), (25, 26), (0, 0), . . . ] where each non-padding pair may identify the start and end character positions in the normalized input for the associated token; other embodiments may include additional fields such as vocabulary version, tokenizer configuration identifiers, and per-token categories, and may emit the record in a binary or text encoding for consumption by downstream components.

In some embodiments, a token embedding module 26 may map token identifiers produced by the tokenizer 24 to fixed-length vectors drawn from a learned embedding space and may emit a sequence of vectors aligned one-to-one with the tokens and any padding positions. The token embedding module 26 may maintain an embedding table stored in device memory that may be addressed by token identifier, may retrieve the corresponding rows, and may arrange the rows into a tensor whose leading dimension corresponds to sequence length. The token embedding module 26 may support mixed precision, and may store the table in eight-bit or sixteen-bit formats with dequantization to a higher-precision accumulator during arithmetic. The token embedding module 26 may maintain separate rows for special tokens such as classification, separator, padding, and unknown markers, and may expose configuration to freeze or fine-tune subsets of the table during training. The token embedding module 26 may initialize rows using a seedable procedure and may apply post-initialization normalization or scaling so that downstream layers of the transformer encoder 30 receive inputs within a configured range.

In some embodiments, the token embedding module 26 may compose embeddings from multiple sources prior to emission. For example, the token embedding module 26 may sum or concatenate a lexical embedding with a segment-type embedding and a feature embedding that may reflect token categories produced by the tokenizer 24, and when concatenation is used the token embedding module 26 may apply a projection layer to match a target vector length. The token embedding module 26 may also compute a subword-composition embedding by combining character-level or byte-level representations for identifiers that are not present in the main embedding table, and may cache the composed result to a small dictionary for later reuse within a batch. The token embedding module 26 may implement hashing-based embeddings that map rare or adversarial substrings to a bounded number of buckets, and may fold multiple hash functions to reduce collisions. The token embedding module 26 may support runtime adapters that apply an affine transformation or a small multilayer perceptron to the retrieved vectors to incorporate tenant-specific adjustments without retraining the entire table.

In some embodiments, the token embedding module 26 may accommodate different input modalities that are represented as text after upstream preprocessing. For structured records, the token embedding module 26 may use separate per-field or per-schema embeddings that may be combined with the lexical embeddings so that identical lexemes from different fields may be distinguished. For markup, the token embedding module 26 may assign distinct embeddings to tag tokens and attribute tokens and may optionally attenuate their magnitudes when a configuration indicates that content tokens should dominate. For code inputs, the token embedding module 26 may maintain separate subspaces for identifiers, literals, and operators and may include a composition routine that derives identifier embeddings from constituent subtokens so that unseen identifiers may still be represented. For multilingual inputs, the token embedding module 26 may select language-specific slices of the embedding table or may apply a shared table and prepend a language indicator embedding that may be combined with the lexical vector for each token.

In some embodiments, the embedding space of the token embedding module 26 may differ from the hidden dimension used by the transformer encoder 30. The token embedding module 26 may therefore emit vectors of a first length and may provide a projection layer or gating layer that maps the emitted vectors to the input dimension expected by the transformer encoder 30, or the transformer encoder 30 may include an input projection that performs this mapping. The token embedding module 26 may also expose an interface to return both the pre-projection and post-projection vectors for diagnostics requested by the controller 15, and may record the projection parameters per model version so that saved artifacts remain compatible with later inference passes. The token embedding module 26 may further implement dropout on the emitted vectors during training, may apply learned scale factors per token category, and may include a normalization step that maintains statistics across batches for stability during optimization.

In some embodiments, the token embedding module 26 may output, for a sequence length L and an embedding width E, a tensor of shape L by E containing a floating-point vector for each token position, along with the attention mask and any segment type identifiers passed through unmodified; for example, given token identifiers [101, 12287, 602, 4219, 117, 7335, 102, 0, 0, 0] and E equal to 8 for illustration, the token embedding module 26 may emit vectors such as [[0.14, −0.07, 0.22, 0.03, −0.11, 0.09, 0.18, −0.05], [−0.02, 0.31, 0.08, −0.12, 0.05, 0.27, −0.04, 0.10], [0.06, −0.15, 0.19, 0.04, 0.02, 0.01, 0.12, 0.07], . . . , [0.00, 0.00, 0.00, 0.00, 0.00, 0.00, 0.00, 0.00]] where the final rows may correspond to padding tokens and may be all zeros or learned padding vectors according to configuration; the attention mask may remain [1, 1, 1, 1, 1, 1, 1, 0, 0, 0], and segment type identifiers may remain [0, 0, 0, 0, 0, 0, 0, 0, 0, 0]. The token embedding module 26 may also emit, when configured, a projected tensor of shape L by D that matches an input width D expected by the transformer encoder 30, and may attach metadata fields indicating the vocabulary version, embedding table checksum, numeric precision used for the vectors, and any dropout or scaling settings applied during emission so that downstream components may interpret the vectors consistently.

In some embodiments, a positional encoding module 28 may receive a sequence of token embeddings or un-embedded tokens and may add or otherwise inject position information so that downstream attention operations may distinguish ordering and distance relationships. The positional encoding module 28 may accept a batch of vectors and a corresponding attention mask from the token embedding module 26 or tokens from tokenizer 24 and may output a position-conditioned tensor with the same leading dimensions. The positional encoding module 28 may maintain configuration identifying the positional scheme to apply, may track sequence length and index offsets, and may expose an interface to generate or look up position values for any index in the sequence, including indices beyond previously observed ranges. The positional encoding module 28 may operate on vectors prior to entry into a transformer encoder 30 or may provide position-dependent transformations that a downstream attention block may consume during score computation.

In some embodiments, the positional encoding module 28 may implement learned absolute position embeddings by maintaining a table that may map each position index to a vector of the same width as the token embeddings. The positional encoding module 28 may retrieve vectors for indices from zero through a configured maximum and may add the retrieved vectors elementwise to the token embeddings to produce position-conditioned embeddings. The positional encoding module 28 may support index shifting so that sequences composed from multiple segments may receive contiguous indices, and may include a padding position that may map to a zero or a learned vector when the attention mask indicates padding. The positional encoding module 28 may persist the learned table with model checkpoints and may expose routines to extend the table by appending additional rows and initializing them according to a seedable procedure when longer sequences are required.

In some embodiments, the positional encoding module 28 may implement sinusoidal position encodings by computing a set of deterministic vectors indexed by token position, where each vector may be derived from a family of periodic functions with different characteristic wavelengths. The positional encoding module 28 may generate these vectors on demand for any index without consulting a stored table, may add them to token embeddings, and may cache recently used vectors for efficiency. The positional encoding module 28 may provide this scheme when inputs may have unknown or varying maximum lengths because the deterministic generation may allow position vectors to be assigned for indices that were not seen during training, which is expected to allow models to process sequences longer than those used during parameter estimation. The positional encoding module 28 may also provide a mixed mode that may combine deterministic vectors with a small learned correction that may be stored in a compact table.

In some embodiments, the positional encoding module 28 may implement relative position methods in which the module may compute position information as a function of the difference between a query index and a key index and may supply this information to attention score computation. The positional encoding module 28 may precompute a banded set of relative offsets within a configured window and may provide per-offset vectors or scalar biases that downstream attention code may add to raw similarity scores. The positional encoding module 28 may maintain a policy for clamping or extrapolating offsets beyond the window and may expose routines to shift or scale offsets when sub-sampling or downsampling operations affect effective stride. The positional encoding module 28 may support rotary position transforms by applying a position-dependent rotation to query and key vectors prior to attention score computation; the module 28 may construct per-index rotation parameters and may apply the rotation in-place to minimize memory traffic.

In some embodiments, the positional encoding module 28 may account for different input modalities or formatting. For structured records containing multiple fields, the positional encoding module 28 may apply per-field position domains so that indices may restart for each field and may add field-domain identifiers that may be combined with the positional values to distinguish identical indices in different fields. For markup inputs, the positional encoding module 28 may apply layout-aware positions by incrementing indices based on both token order and line or block boundaries and may include a separate channel that may encode nesting depth for tags. For code inputs, the positional encoding module 28 may apply token positions that reflect lexical order and may attach block-level positions that may represent indentation or brace depth; the module 28 may expose controls to include or omit the block channel based on configuration. For multilingual inputs, the positional encoding module 28 may apply the same positional scheme across scripts or may maintain per-script offsets that may be combined with position vectors so that different scripts may not overlap in the index space when such separation is desired.

In some embodiments, the positional encoding module 28 may output, for a sequence length L and a positional width P, a position tensor of shape L by P and metadata that may include the attention mask and the zero-based position index assigned to each token position. The position tensor may contain one vector per position aligned to the input order; for example, for L equal to 6 and P equal to 8, the module 28 may emit [[0.00, 0.10, −0.07, 0.21, −0.03, 0.05, 0.12, −0.04], [0.00, 0.20, −0.14, 0.19, −0.06, 0.10, 0.24, −0.08], [0.00, 0.30, −0.21, 0.17, −0.09, 0.15, 0.36, −0.12], [0.00, 0.40, −0.28, 0.15, −0.12, 0.20, 0.48, −0.16], [0.00, 0.50, −0.35, 0.13, −0.15, 0.25, 0.60, −0.20], [0.00, 0.60, −0.42, 0.11, −0.18, 0.30, 0.72, −0.24]], an attention mask such as [1, 1, 1, 1, 1, 0] where the final position may be padding, and a position index array such as [0, 1, 2, 3, 4, 5]. In some embodiments that apply relative or rotary encodings, the module 28 may instead or additionally output a compact structure that may include per-position rotation parameters or a table of relative-offset identifiers and associated coefficients, while preserving the same alignment to L so that downstream components may associate each position with either a direct position vector or with parameters required to compute position-conditioned attention scores.

In some embodiments, the outputs of the positional encoding module 28 may be combined with the outputs of the token embedding module 26 by pairing vectors at the same index so that the position representation for a given unit of input may be applied to the token embedding for that unit. When absolute position vectors are used and P matches the embedding width E (or after projecting one of the vectors to a shared width), the controller of the AI model 16 may instruct a preparation stage to add the vectors elementwise; for example, if the token embedding at index 2 may be [0.06, −0.15, 0.19, 0.04, 0.02, 0.01, 0.12, 0.07] and the position vector at index 2 may be [0.00, 0.30, −0.21, 0.17, −0.09, 0.15, 0.36, −0.12], the combined vector emitted to the transformer encoder 30 may be [0.06, 0.15, −0.02, 0.21, −0.07, 0.16, 0.48, −0.05]. In some embodiments, the vectors may be concatenated to produce a length E+P vector and then mapped by a learned projection to the width expected by the transformer encoder 30; in other embodiments, the token embedding module 26 may pass embeddings unchanged while the positional encoding module 28 may deliver rotation or offset parameters that the attention code may apply during score computation, with the pairing maintained by using the same position index and attention mask across both outputs.

In some embodiments, a transformer encoder 30 may consume a sequence of such vectors and may apply a repeating pattern of sublayers across a configurable number of blocks, e.g., in a pipeline. A block may include an attention sublayer and a feed-forward sublayer with residual connections and normalization applied around each sublayer. The transformer encoder 30 may maintain configuration identifying the number of blocks, the number of attention heads, the hidden dimensions for projections, and the activation functions used in the feed-forward path. The transformer encoder 30 may accept masks indicating which positions are padding or otherwise excluded and may propagate those masks so that score computations and updates do not modify excluded positions. The transformer encoder 30 may operate in pre-normalization mode in which inputs to each sublayer may first be normalized and then transformed, or in post-normalization mode in which the sublayer output may be normalized after the residual merge, and the same ordering may be applied consistently within a run.

In some embodiments, the attention sublayer may compute per-head query, key, and value projections by multiplying the input sequence by learned weight matrices for each head. The attention sublayer may then compute similarity scores between queries and keys for each head, may apply attention masks that zero out or down-weight illegal or padded positions, and may apply a normalization over the score dimension to obtain per-head weights. The attention sublayer may multiply the per-head weights by the corresponding values to produce per-head outputs, may concatenate the per-head outputs along a channel dimension, and may apply an output projection to produce the sublayer output. The attention sublayer may incorporate relative position information by adding a learned or computed bias to the similarity scores as a function of the distance between positions, or may apply rotary transformations that rotate query and key channels according to position index prior to score computation. The attention sublayer may also implement structured sparsity by selecting a subset of key and value positions for each query according to a mask supplied by upstream logic, by restricting attention to local windows around each position, or by routing subsets of tokens to specialized attention experts, and these selections may be recomputed per block or held fixed across multiple blocks.

In some embodiments, an attention sublayer may implement scaled dot-product attention by projecting the input sequence into query, key, and value vectors, computing a score for each query-key pair by applying a similarity function over their projected channels, applying one or more masks that may zero or down-weight prohibited or padded positions, normalizing the scores across the key dimension using a selected normalizer such as a softmax or a sparse normalizer, and forming a weighted sum of the value vectors according to the normalized weights. The attention sublayer may repeat these steps independently across multiple heads using distinct projection matrices and may concatenate the per-head outputs, followed by a linear projection to the model dimension. The attention sublayer may support causal masks that may restrict each position to attend only to earlier positions, segment masks that may prevent score contributions across segment boundaries, and bias additions that may incorporate absolute or relative position information prior to the normalization step. The attention sublayer may accept alternative normalizers such as sparse normalization functions that may assign zero weights to low-scoring positions, and may implement temperature scaling and clipping prior to normalization.

In some embodiments, local or windowed attention may partition the sequence into windows and, for each query position, may restrict the set of candidate keys to positions within a configured neighborhood. The attention sublayer may compute scores only within the selected window, may optionally extend the neighborhood by a dilation stride that may skip positions at uniform intervals, and may merge overlapping neighborhoods by summing or averaging overlapping contributions. The attention sublayer may support blockwise schemes in which the sequence may be divided into fixed-size blocks and, for each query block, a set of key blocks may be selected using a static pattern, an index list, or a runtime policy derived from upstream signals; scores may then be computed only across the selected block pairs and aggregated per query position. The attention sublayer may apply top-k selection by first computing approximate or exact scores for a superset of candidate keys and then retaining only the k highest scores per query for normalization and value aggregation, where k may be constant or may vary with the query position.

In some embodiments, kernelized attention may approximate the softmax or other score functions with feature maps so that attention weights may be computed through linear operations. The attention sublayer may transform queries and keys with a random or deterministic feature map that may approximate the exponentiated similarity, may compute a key-side summary for each head by accumulating transformed keys multiplied by values across the sequence or block, and may obtain the output at a query position by multiplying the transformed query by the key-side summary and applying a normalization computed from the transformed query and a separately accumulated key-only summary. The attention sublayer may update these summaries incrementally across positions to support streaming inputs, and may reset or carry the summaries across block boundaries based on configuration. The attention sublayer may select the feature map from a library that may include trigonometric, Gaussian, or orthogonal feature constructions and may maintain per-head seeds or parameters for reproducibility.

In some embodiments, low-rank attention may reduce computation by projecting keys and values to a smaller set of basis vectors before score computation. The attention sublayer may compute a set of basis keys and basis values by applying linear projections or learned pooling over the key and value dimensions, may compute scores between queries and basis keys, and may form outputs by weighting basis values according to the normalized basis scores. The attention sublayer may determine the number of basis vectors by configuration or may compute them adaptively from the sequence using a clustering or sketching routine executed per batch. The attention sublayer may also implement Nyström-style procedures by sampling a subset of landmark positions, constructing an attention approximation from those landmarks, and applying the approximation to all query positions using precomputed pseudoinverses or factorizations stored for the duration of the forward pass.

In some embodiments, multi-query and grouped-query attention may share key and value projections across multiple heads to reduce memory movement while maintaining separate query projections per head or per group of heads. The attention sublayer may compute a single set of keys and values for all heads or for a subgroup, may compute per-head or per-group queries, and may reuse the shared keys and values during score computation and value aggregation. The attention sublayer may implement expert attention by routing tokens to one or more attention experts according to a learned gate that may emit routing weights per token; each expert may perform attention over a subset of the sequence or over expert-local projections, and the outputs may be combined according to the gate weights. The attention sublayer may record routing statistics and may apply per-expert capacity limits, overflow handling, or auxiliary regularization during training.

In some embodiments, cross-attention may accept an external memory consisting of keys and values computed from another sequence or from an index that may have been built offline. The attention sublayer may project the current sequence into queries and may project the memory into keys and values, may compute scores between the queries and the memory keys, and may form outputs by aggregating the memory values according to normalized scores. The attention sublayer may combine self-attention and cross-attention within a block by applying self-attention first to refine the current sequence and then applying cross-attention to incorporate external context, or by interleaving the two with residual connections. The attention sublayer may use retrieval indices to select a subset of memory entries prior to score computation and may attach provenance identifiers to outputs so that downstream components may audit which memory entries contributed to the aggregation.

In some embodiments, relative-position and rotary-position attention may incorporate position information directly into the score computation. The attention sublayer may compute a relative offset between a query index and a key index and may add a learned or computed bias that depends on this offset to the raw similarity score prior to normalization. The attention sublayer may apply a rotation to the channels of the query and key vectors according to per-index rotation parameters, and may compute scores from the rotated channels while leaving values unmodified; the rotation parameters may be generated on demand for any sequence length and may be cached for reuse. The attention sublayer may clamp or bucket relative offsets beyond a configured window and may map large offsets to a shared set of parameters.

In some embodiments, normalization and stabilization procedures may be applied around attention computations. The attention sublayer may apply layer normalization or other normalizers to inputs before projection, may clip scores or subtract a per-query maximum prior to normalization, and may apply dropout to the normalized weights or to the value outputs during training. The attention sublayer may accept precision control signals that may select lower-precision storage with higher-precision accumulation, and may apply checkpointing to recompute intermediate tensors on demand. The attention sublayer may expose configuration to select among the described attention forms per block, may mix forms within a block by assigning different heads to different schemes, and may switch forms at runtime in response to control inputs from upstream components.

In some embodiments, the feed-forward sublayer may apply a position-wise transformation to each token representation independently. The feed-forward sublayer may include a first linear transformation that expands channel width, an activation such as a rectified linear unit, a gated linear unit, or a Gaussian error linear unit, and a second linear transformation that reduces channel width back to the model dimension. The feed-forward sublayer may include optional dropout on intermediate activations and may include layer-wise scaling parameters that modulate the output before the residual merge. The feed-forward sublayer may be replaced in some blocks by an expert routing layer in which a learned gate may select one or more experts to process a token's vector and may combine expert outputs according to the gate weights, and the gate may receive an auxiliary loss or regularization to maintain balanced routing across experts.

In some embodiments, residual connections may add the input of a sublayer to the output of that sublayer, and normalization layers such as layer normalization may be applied either before or after the sublayer depending on the selected ordering. The transformer encoder 30 may support mixed-precision arithmetic for projections and activations with accumulation in a higher precision for stability, and may include gradient checkpointing during training to recompute certain activations on demand. The transformer encoder 30 may accept per-sequence or per-token metadata channels, including segment identifiers and position information, and may incorporate those channels into either the attention score computation or the sublayer inputs. The transformer encoder 30 may also accept control masks that specify causal relationships or block boundaries when inputs are formed from multiple segments, and the attention sublayer may clamp or rescale scores at those boundaries to prevent information flow across restricted segments.

In some embodiments, the transformer encoder 30 may expose hooks that permit intermediate features to be pooled or extracted at specified blocks. The encoder may accept a pooling directive from an upstream component indicating whether a classification token, a mean over unmasked positions, or an attention-weighted summary should be emitted at the end of the stack. The encoder may process mini-batches by padding sequences to a common length and may apply the attention mask so that padding positions do not affect similarity scores or value aggregation. The encoder may maintain per-block statistics such as activation ranges, token drop counts for sparse attention selections, and head-level routing summaries when expert attention is used, and may emit these statistics for diagnostics or downstream sensitivity scoring.

In some embodiments, the transformer encoder 30 may output, for each input sequence, a set of contextual token representations arranged as a tensor whose first dimension may correspond to sequence length and whose second dimension may correspond to a model width. The tensor may align one vector to each token position, and a parallel attention mask may indicate which positions are padding. For example, for a sequence of ten tokens and a model width of seven hundred sixty-eight, the transformer encoder 30 may emit ten vectors each of length seven hundred sixty-eight together with a mask that marks content positions as active and padding positions as inactive. These vectors may encode information derived from the surrounding tokens and any position signals applied earlier in the pipeline.

In some embodiments, the transformer encoder 30 may also emit a sequence-level feature vector that may summarize the token representations. The sequence-level feature vector may be obtained by selecting a classification token representation, by averaging vectors over unmasked positions, or by applying an attention-based pooling that may compute a weighted combination of token vectors using learned weights, and the selected method may be recorded in metadata. The sequence-level feature vector may be further mapped by a projection so that its length matches an input width expected by downstream components. The outputs may therefore include the per-token tensor, the attention mask, and the sequence-level feature vector, which may together describe what the model knows about the input at the end of the encoder: a fixed-length representation of the sequence and position-aligned token vectors that may be referenced by the Gaussian-process layer 32 and the likelihood and marginalization module 34.

In some embodiments, a Gaussian process layer 32 may act as a probabilistic head that may take the sequence-level feature vector coming from the transformer encoder 30 and may compare that vector to a set of reference points (e.g., in an embedding space of the feature vector) stored in memory. The layer 32 may measure how similar the input vector is to each reference point, may combine those similarities with learned values kept at the reference points, and may produce, for each candidate class, a latent score that may represent what the model would predict and a companion spread value that may represent how uncertain that score may be. The layer 32 may repeat these steps independently for all classes or may compute them together when class relationships are modeled jointly, and may output a table of per-class scores and uncertainties that the likelihood and marginalization module 34 may turn into class probabilities.

In some embodiments, the Gaussian process layer 32 may also perform small randomized trials during inference by drawing several possible latent scores consistent with what the stored parameters may allow, may pass each draw through the same label-making step, and may average the resulting probability vectors so that the final probabilities may reflect both what the model predicts and how unsure it may be. The layer 32 may be trained by adjusting kernel settings that may control how similarity falls off with distance, by moving or adding reference points so that they cover the regions the feature vectors may visit, and by updating the stored values at those points using batches of examples. The layer 32 may refine certain settings by running short sequences of random updates that may stop when a stability check may be met, and may store the resulting settings so that later requests may use them directly or with a small number of additional draws.

In contrast to models that just infer an output, the Gaussian process layer, in some embodiments, also says how sure it is about that inference, in a principled way. One can of the transformer as turning an input sentence into a detailed "fingerprint," and the Gaussian process layer as checking how much that fingerprint resembles a library of known cases. When it finds close matches, it produces a strong score for a class and a small uncertainty, and when the input looks unfamiliar, it lowers the score and raises the uncertainty. That uncertainty lets the system act more intelligently at inference time: it can route challenging inputs to a slower, more careful path, ask for more context, or hand them to a person. It also is expected to give better-calibrated probabilities (e.g., that outputs are correct) and can adapt with relatively few new examples by adding or moving its reference points, so the user receives predictions (or other classifications) that are not only accurate but also candid about when they might be wrong.

In more precise terms, in some embodiments, a Gaussian process layer 32 may operate as a probabilistic head that may accept a sequence-level feature vector emitted by the transformer encoder 30 and may produce, for each candidate output class, latent quantities that may include a measure of central tendency and a measure of dispersion. The Gaussian process layer 32 may maintain parameters that may include kernel hyperparameters, noise parameters, and an inducing-point set that may represent reference locations in the feature space. During an inference pass, the Gaussian process layer 32 may compute similarities between the input feature vector and the inducing-point set according to a selected kernel, may combine those similarities with stored posterior parameters over the inducing points, and may generate, for each class, a latent score together with a corresponding uncertainty. The Gaussian process layer 32 may emit these latent quantities for consumption by a likelihood and marginalization module 34, and may also emit auxiliary diagnostics such as per-class influence weights of inducing points and summary statistics over the computed similarities.

In some embodiments, the Gaussian process layer 32 may implement a sparse variational procedure in which the inducing-point set may be smaller than the training set and may be learned jointly with kernel hyperparameters. The layer 32 may store a posterior over the function values at the inducing points as a set of learned means and learned covariances, and may retrieve a conditional latent distribution for a new feature vector by combining input-inducing similarities with those stored parameters. The layer 32 may support automatic relevance determination by maintaining a separate length-scale or bandwidth parameter per feature-channel group and may apply those parameters when computing similarities. The kernel used to compute similarities may be drawn from a library that may include radial basis, Matérn family, periodic, linear, spectral mixture, or sums and products of those kernels, and the layer 32 may accept a configuration that selects one kernel or a composition per class or per head.

In some embodiments, the Gaussian process layer 32 may implement a multi-output procedure for classification in which either one independent latent process per class may be maintained or a joint latent process with cross-class covariance may be maintained. For the independent procedure, the layer 32 may keep separate inducing sets and kernel parameters per class or may share the inducing points while keeping class-specific posterior parameters. For the joint procedure, the layer 32 may store a block-structured set of posterior parameters over inducing points indexed by class and may compute class latents together so that cross-class dependencies may be captured. The layer 32 may export an interface to retrieve either only the per-class latent means and variances or, when requested, selected off-diagonal terms that may describe how pairs of class latents may co-vary.

In some embodiments, the Gaussian process layer 32 may support deep-kernel operation by passing the sequence-level feature vector through a projection network prior to kernel evaluation. The projection network may be a linear map, a gated linear block, or a small multilayer perceptron whose parameters may be trained with the rest of the system, and the projected vector may be used as the input to the kernel. The layer 32 may maintain normalization settings so that projected vectors may lie within a configured range before kernel evaluation, and may record projection parameters with model checkpoints. The layer 32 may also support heteroscedastic noise by accepting an auxiliary noise estimate per input, which may be produced by a small head fed from the transformer encoder 30, and may incorporate that estimate into the dispersion measure it returns for each class.

In some embodiments, the Gaussian process layer 32 may be trained using variational inference that may optimize an objective formed from a fit term and a regularizer over the stored posterior parameters, and may process training data in mini-batches. The layer 32 may accept an initialization produced by maximizing a marginal-likelihood objective with gradient methods and may refine those parameters during variational updates. The layer 32 may also be trained using Markov chain Monte Carlo procedures applied to selected hyperparameters such as length-scales, kernel amplitudes, and noise terms. The layer 32 may implement adaptive chain lengths by monitoring chain statistics and may stop sampling a parameter when a convergence criterion may be satisfied, and may employ hierarchical sampling in which global or structural parameters may be sampled before lower-level parameters. The layer 32 may accept stochastic gradient-based Bayesian steps that may interleave with sampling steps so that hyperparameters may move with mini-batch gradients while still exploring uncertainty by sampling. The layer 32 may further employ quasi-Monte Carlo draws when forming predictive averages during training and evaluation to reduce the number of samples required for a given accuracy.

In some embodiments, the Gaussian process layer 32 may implement probabilistic dropout regularization during training by associating latent gating variables with connections that contribute to kernel computations or to inducing-point interactions. For each batch, the layer 32 may sample the gating variables to form a mask, may apply the mask by omitting or scaling contributions from selected connections or inducing points, and may compute a training objective that may represent an expectation over those gates using either direct sampling or a differentiable relaxation. When Bayesian inference may be active, the layer 32 may marginalize or sample the gating variables together with other parameters so that posterior evaluations consider multiple masked subnetworks. The layer 32 may record mask statistics per step for diagnostics and may prune connections whose gates may remain near zero for an extended period based on configuration.

In some embodiments, the Gaussian process layer 32 may be deployed in multiple configurations to support different architectural patterns. A single probabilistic head may produce latent quantities for all classes and may feed a single likelihood and marginalization module 34. Multiple probabilistic heads may be arranged in parallel, where each head may receive the same feature vector and may produce separate latent quantities that may be combined by an aggregation module; in this arrangement, per-head kernels, inducing sets, or deep-kernel projections may differ, and the aggregation module may compute a weighted combination of the resulting latents or probabilities. In other embodiments, probabilistic heads may be stacked, where an upper head may receive as input the latent quantities or the aggregated probabilities emitted by a lower head and may refine them by computing an additional layer of latent quantities; for example, a lower head may operate with independent per-class processes while an upper head may apply a joint process to capture residual cross-class dependencies.

In some embodiments, the Gaussian process layer 32 may export uncertainty signals that the sensitivity scorer 18 may consume. The layer 32 may compute per-class dispersion measures and may combine them into an entropy-like signal or a mutual-information-like signal by forming averages over multiple latent draws or hyperparameter draws when requested by the controller 15. The layer 32 may emit a compact record per request that may include input-inducing similarity weights, per-class latent measures, a scalar uncertainty used for routing, and optional provenance identifiers that may indicate which inducing points contributed most to the prediction. These fields may be logged and may be referenced by the mode selector 20 when deciding whether to invoke a deterministic path or a sampling-heavy path on subsequent steps of the request.

In some embodiments, the Gaussian process layer 32 may provide alternative algorithms or architectures that may produce uncertainty-aware latents with different tradeoffs. A Bayesian linear head may accept the sequence-level feature vector and may maintain a posterior over linear weights for each class; the head may draw or marginalize weights to produce latent means and dispersions and may expose the same likelihood interface as the Gaussian process layer 32. A Monte Carlo dropout head may apply dropout at test time across multiple forward passes and may aggregate the resulting logits to approximate a distribution over latents, while exposing the same outputs and metadata fields. A deep-ensemble head may maintain multiple deterministic classifiers trained from different initial states and may combine their logits and spreads to produce latent means and dispersions. A Laplace-approximation head may compute a second-order approximation around a trained deterministic head and may produce a Gaussian posterior over weights that may be used to draw latent samples. These alternatives may plug into the same likelihood and marginalization module 34 and may be selected per model version or per tenant.

In some embodiments, the Gaussian process layer 32 may implement batching and caching strategies to reduce latency. The layer 32 may batch kernel computations across inputs by arranging feature vectors into a matrix and may compute input-inducing similarities in a single call so that memory movement may be reduced. The layer 32 may cache factorization artifacts associated with inducing-point posterior parameters, such as matrix decompositions or preconditioners, and may reuse those artifacts across requests until a parameter update may occur. The layer 32 may support mixed precision by storing kernel intermediates in reduced precision and accumulating sensitive reductions in higher precision. The layer 32 may expose a streaming interface that may accept one input feature vector at a time and may update running summaries so that outputs for the current input may be produced without recomputing summaries for previous inputs.

In some embodiments, the Gaussian process layer 32 may maintain tenant-scoped parameter sets so that different organizations may deploy tailored kernels, inducing sets, and priors without sharing state. The layer 32 may also maintain per-class calibration settings that may include temperature or link-function parameters used by the likelihood and marginalization module 34, and may emit those settings with the latent quantities so that downstream computations may remain consistent with the stored configuration. The layer 32 may export lifecycle hooks that may respond to controller 15 messages to rotate parameter snapshots, to warm-start sampling chains with prior draws, or to update the inducing-point set by running a selection routine over recent feature vectors. The selection routine may score candidate inducing locations using coverage metrics over the observed feature distribution and may add, remove, or relocate inducing points according to configured budgets.

In some embodiments, the Gaussian process layer 32 may participate in active data selection by emitting acquisition scores that may be computed from the returned dispersion measures, from disagreement across multiple probabilistic heads, or from sensitivity signals that the sensitivity scorer 18 may compute. The controller 15 may write those acquisition scores to a queue consumed by the hybrid Bayesian training module 17, which may then schedule future training batches that include records with higher scores. The Gaussian process layer 32 may record per-request latency and sample counts when sampling may be requested and may adjust its internal sampling budgets in response to mode selector 20 directives so that aggregate compute targets may be met. The layer 32 may further expose controls to cap the number of inducing points used at inference, to clip dispersion measures to bounded ranges for downstream stability, and to return compact summaries in place of full diagnostic records when a user device 14 may request a minimal response.

In some embodiments, the Gaussian process layer 32 may output, for each input sequence, a structured record that may include a per-class latent mean vector and a per-class latent variance vector, and in some cases a compact representation of cross-class covariance, together with identifiers for the model version and any hyperparameter sample used to produce the latents. For example, for three candidate output classes labeled "reset," "billing," and "other," the layer 32 may emit latent means such as [1.20, −0.30, 0.10] and latent variances such as [0.05, 0.40, 0.20], where the first list may be interpreted as class-specific latent scores prior to any likelihood mapping and the second list may be interpreted as dispersion values paired positionally with those scores; when configured to report dependencies, the layer 32 may also include a small payload such as a lower-triangular covariance summary or a per-class correlation list. The record may further include auxiliary fields such as the indices of the inducing points that most influenced the computation, their contribution weights, and a flag indicating whether heteroscedastic noise was applied, so that the likelihood and marginalization module 34 may transform the latents into predictive class probabilities and may derive uncertainty summaries using either deterministic or sampling-based paths.

In some embodiments, a likelihood and marginalization module 34 may receive, from a probabilistic head such as the Gaussian process layer 32, records that may include per-class latent quantities for a sequence-level feature vector together with metadata describing hyperparameter samples, covariance structure, and requested inference mode. One can think of the likelihood and marginalization module 34, in some embodiments, as the step that turns the Gaussian process layer's "raw scores with uncertainty" into actual class probabilities the user can read and use, plus a number that summarizes how unsure the system is. In some embodiments, module 34 takes in, for each class, a latent mean (the raw score) and a latent variance (how wobbly that score might be), and sometimes extra samples or settings that describe uncertainty in the model's own parameters. First, in some embodiments, module 34 applies a likelihood (e.g., with a rule for turning each possible set of latent scores into per-class chances that add up to one). Then module 34, in some embodiments, does marginalization, e.g., it does not rely on a single set of scores: it considers many plausible "what-if" versions consistent with the uncertainty, converts each one into probabilities, and averages them. If time is limited, module 34 may do a quick one-pass version, or if the case is challenging, module 34 may draw more "what-ifs" before averaging.

The outputs, in some embodiments, are a probability for each class (for example, [reset: 0.82, billing: 0.06, other: 0.12]) and one or more uncertainty measures (for example, an entropy value showing how spread out those probabilities are). These results may go back to the controller 15 for logging and storage, to the user interface module 22 for display, and to the mode selector 20 so the system can decide whether to take a faster or more careful path next time. In short, in some embodiments, the module 34 takes the GP layer's uncertain scores, applies a consistent rule to turn them into probabilities, averages over the uncertainty rather than ignoring it, and hands off clean probabilities and uncertainty numbers for the rest of the system to use.

To these ends or others, the module 34 may parse these records, may construct an internal work plan that identifies which dimensions are to be integrated by sampling and which dimensions are to be handled by closed-form updates, and may initialize accumulators for probability vectors, uncertainty summaries, and diagnostics. The module 34 may operate in batch across multiple inputs by arranging latents and optional covariance factors into contiguous device memory, may apply attention masks to ignore padded items, and may set random number generator seeds and sampling budgets according to directives from the controller 15 or the mode selector 20.

In some embodiments directed to multi-class classification, the module 34 may apply a link function that may map per-class latent quantities to a probability simplex. The module 34 may, for a configured number of trials, draw one or more latent vectors consistent with the stored posterior over latents for a given input, may transform each draw by a selected link such as a normalized exponential or a probit-style mapping, and may accumulate the resulting probability vectors into a running average. When hyperparameter uncertainty may be present, the module 34 may nest latent draws inside hyperparameter draws by first selecting a hyperparameter record from a pool produced by a training procedure, then drawing latents conditional on that record, and then emitting contributions to the accumulators. The module 34 may track the number of effective draws used for each input and may record convergence indicators such as running variance of the accumulated probabilities and change in summary metrics over a sliding window of draws.

In some embodiments, the module 34 may implement approximate marginalization paths in place of or in addition to sampling. The module 34 may compute local curvature information around the latent mode and may apply a second-order approximation to estimate the contribution of latent dispersion to the class probabilities without drawing explicit samples, and may repeat the procedure for each relevant hyperparameter setting. The module 34 may apply expectation propagation style site updates by iteratively refining moment estimates that match transformed latents to an auxiliary family and may stop when a threshold on parameter movement may be reached. The module 34 may also support moment-matching procedures that may estimate transformed means and spreads by applying deterministic quadrature in a reduced-dimensional subspace identified by principal directions of the latent covariance, and may combine those estimates with closed-form normalization steps. For correlated class latents, the module 34 may factor a stored covariance representation into a product of a low-rank term and a diagonal term, may apply draws or moment computations in the low-rank subspace, and may fold the diagonal contribution into the normalization.

In some embodiments, the module 34 may support likelihood families beyond multi-class classification. A regression path may accept a scalar latent and a noise parameter and may output a predictive mean and dispersion that may include both latent uncertainty and observation noise, with closed-form updates when the noise model may be Gaussian and with sample-based or quadrature-based updates for non-Gaussian noise models. A multi-label path may apply per-class binary links and may integrate each class marginal independently or with a stored dependence structure when provided. An ordinal path may map a latent score against learned thresholds to produce category probabilities and may integrate over the latent and thresholds according to the requested mode. A count-model path may apply a Poisson- or negative-binomial-style likelihood by transforming the latent by an appropriate nonlinearity and may average the resulting rate parameters over latent or hyperparameter variability. A heteroscedastic path may accept an auxiliary noise estimate and may condition the dispersion of the predictive distribution on that estimate during the combination step.

In some embodiments, the module 34 may implement sampling procedures with variance-reduction and budget-control features. The module 34 may employ quasi-Monte Carlo draws by generating low-discrepancy sequences in the base parameterization of the latent space and may transform those sequences to match the stored posterior by applying a reparameterization map that may not require explicit matrix inversion. The module 34 may generate antithetic pairs by reflecting base draws to reduce estimator variance, may apply stratification by dividing the draw space into bins according to magnitude of latent perturbations and sampling evenly across bins, and may compute control-variate corrections by subtracting a baseline transform with a known expectation. The module 34 may adapt the number of draws per input by estimating the stability of requested summary metrics, may stop when successive partial averages change by less than a configured tolerance, and may escalate to larger budgets when a gate supplied by the mode selector 20 may request a higher-fidelity evaluation. The module 34 may cache intermediate transform states for reuse across nearby inputs and may invalidate caches when kernel or hyperparameter identifiers change.

In some embodiments, the module 34 may apply normalization and stabilization steps to protect against numeric issues. The module 34 may subtract a per-sample offset from transformed latent values prior to normalization so that the resulting probability computation may remain within representable ranges, may clip intermediate values according to configuration, and may apply temperature scaling as a post-processing step when a calibration record may be present. The module 34 may handle masked positions by zeroing contributions and renormalizing over unmasked classes where a class subset may be active, and may handle cases where all but one class may be masked by emitting a one-hot probability vector. The module 34 may record normalization constants per input and draw and may expose those constants on request for audit or reproducibility.

In some embodiments, the module 34 may compute uncertainty summaries and diagnostics from the accumulated outputs. The module 34 may compute a predictive entropy for each input by applying a summary over the accumulated probability vector, may compute a per-class variance of the predicted probability by comparing per-draw probabilities to the average, and may compute a mutual-information-style metric when hyperparameter draws may be present by comparing entropy across and within draws. The module 34 may emit, for each input, the final probability vector, one or more uncertainty scalars, and a diagnostics record that may include the number of latent and hyperparameter draws used, the random seed identifiers, the presence or absence of variance-reduction techniques, and an indicator of whether adaptive stopping may have triggered. The module 34 may populate fields that the controller 15 may use to decide whether to retain detailed per-draw traces or only aggregate summaries and may write references to stored artifacts for later visualization by the user interface module 22.

In some embodiments, the module 34 may use alternative architectures that may perform the same mapping from latent quantities to predictive distributions. A Dirichlet-mapping path may convert a vector of logits and a dispersion control into concentration parameters of a Dirichlet distribution and may compute class probabilities as the normalized expected values of those concentrations while integrating concentration uncertainty by draws or by a closed-form update when configured. A logistic-normal path may represent the predictive distribution as a transformed normal in the simplex and may apply sampling or moment procedures in the pre-transform space before applying the link and normalization. A calibration-mapping path may apply a learned monotone transformation to logits prior to normalization, where the transformation may be stored per tenant or per model version, and may integrate over transformation parameters when those parameters may be expressed with a posterior from training. A stacked path may run multiple likelihood heads in sequence, where a first head may compute class probabilities from latents and a second head may refine those probabilities by mixing with a reference distribution conditioned on metadata.

In some embodiments, the module 34 may be organized for throughput and latency targets by combining vectorized kernels and asynchronous execution. The module 34 may execute per-batch transforms on a graphics processing unit device, may pipeline latent drawing and link application so that one set of draws may be in flight while aggregation may occur for the previous set, and may shard hyperparameter draws across workers that may return partial aggregates to a coordinator. The module 34 may export a streaming interface that may accept one input at a time, may emit partial probability vectors after a configured number of draws, and may finalize the output when a stopping condition may be met or when a maximum budget may be reached. The module 34 may also expose a deterministic path that may apply only a single transform of the latent means followed by normalization, and may switch between the deterministic and stochastic paths according to directives from the mode selector 20 or thresholds computed internally from preliminary sensitivity scores.

In some embodiments, the AI model 16 may be trained end-to-end on batches of records that may include tokenized inputs, segment and position metadata, and supervision targets such as class labels, ordinal categories, numeric responses, or multi-label indicators. During a training step, gradients may be computed with respect to parameters of the token embedding module 26, the positional encoding module 28 when learned positions are used, the transformer encoder 30, and parameters associated with a probabilistic head that may include the Gaussian process layer 32 and any projection feeding it. The system may apply one or more loss terms derived from a likelihood applied to outputs of the probabilistic head and, when uncertainty supervision may be provided, auxiliary losses defined on calibration or dispersion summaries. Parameters may be updated with an optimizer while maintaining checkpoints that may record model version, tokenizer configuration, and positional encoding settings so that inference services may reference consistent artifacts.

In some embodiments, training may be staged so that different parts of the AI model 16 may be trained independently or with different update policies. A pretraining phase may train the transformer encoder 30 on self-supervised objectives constructed from unlabeled corpora, such as masked token prediction or next-span prediction, while the token embedding module 26 and the positional encoding module 28 may be updated jointly or partially frozen depending on configuration. A subsequent fine-tuning phase may introduce task labels and may update the transformer encoder 30 together with a probabilistic head. In some cases, the transformer encoder 30 may be held fixed while only a projection and the Gaussian process layer 32 may be trained, and in other cases small adaptation modules such as low-rank adapters may be trained while the base encoder remains read-only. The Gaussian process layer 32 may receive its own training schedule, which may include fitting kernel and noise hyperparameters, learning inducing-point locations and posterior statistics, and, when used, training an auxiliary heteroscedastic noise head emitted by the transformer encoder 30.

In some embodiments, the AI model 16 may be trained on heterogeneous datasets drawn from tenant-specific domains and shared pools. Example training sources may include customer-support transcripts labeled into categories, compliance documents labeled with risk classes, software issue reports with multi-label tags, product descriptions mapped to taxonomy nodes, and semi-structured records with fields mapped to target attributes. Additional variants may include ordinal ratings for prioritization, continuous targets such as time-to-resolution for regression, and weak labels produced by heuristic rules or distant supervision. When multiple tasks may be present, the controller 15 may alternate tasks per batch and may route task-specific heads or adapters while sharing the transformer encoder 30, and the probabilistic head may be instantiated per task or shared with task identifiers passed as conditioning inputs. Tenant-scoped fine-tuning may train small adapter weights or a projection into the Gaussian process layer 32 while leaving shared parameters unchanged, and periodic refresh cycles may retrain selected components using newly accrued data without modifying frozen components.

In some embodiments, a hybrid Bayesian training module 17 may coordinate parameter estimation for the AI model 16 and a probabilistic head that may include the Gaussian process layer 32, and may operate as a set of services that may prepare data, drive optimization and sampling loops, evaluate diagnostics, and commit checkpoints. One can think of hybrid Bayesian training as using two complementary learning styles together so the model learns quickly and also knows how unsure it is. The first style may be gradient training, e.g., where the system looks at many examples in small batches and nudges its knobs in the direction that makes mistakes smaller. This approach is often quick and scales to large datasets. The second style may be Bayesian sampling, e.g., where for a few particularly impactful parameters (like the Gaussian-process layer's kernel settings or noise levels), the system does short, guided "what-if" runs to explore multiple plausible values that fit the data. Instead of locking those parameters to a single number, the system 12 keeps a small set of reasonable possibilities.

This mix, in some embodiments, is used because it is expected to provide the best of both worlds. The gradient part learns good features and reasonable defaults quickly. The Bayesian part keeps track of uncertainty about the model's own settings, which tends to produce probabilities that line up better with reality and honest "I'm not sure" signals. In practice, training cycles may alternate: many fast gradient steps to improve the network, then brief sampling bursts on the uncertain parameters, stopping each burst when simple convergence checks say "you have sampled enough." Later, when making predictions, the model may average across those sampled settings rather than pretending it knows them exactly.

In short, some embodiments of this hybrid training entails: prepare batches of labeled data; do standard backprop updates on the transformer and head; every so often, pause to sample several reasonable settings for the Gaussian-process hyperparameters; keep the ones that fit well; repeat. Along the way the system may use approaches like low-discrepancy "random" draws, lightweight dropout-style regularization, or small adapter layers, all to keep training stable and efficient while preserving a clear picture of uncertainty.

To these ends or others, the module 17 may ingest training records, may normalize and tokenize inputs using the tokenizer 24 configuration selected by a tenant, and may create shuffled mini-batches with sequence-length bucketing to reduce padding. The module 17 may construct per-batch requests to the AI model 16 that may include mode flags for training, precision settings, dropout seeds, and an identifier of the current parameter snapshot. The module 17 may maintain a schedule that may interleave stochastic gradient-based updates with Bayesian sampling phases and may advance that schedule according to wall-clock targets, gradient-norm monitors, and convergence signals received from downstream samplers.

In some embodiments, a stochastic gradient-based Bayesian inference loop may run for a configured number of mini-batches and may update parameters of the transformer encoder 30, any projection network feeding the Gaussian process layer 32, kernel hyperparameters, and variational parameters tied to inducing-point values. The module 17 may compute per-batch losses formed from a fit term and regularizers, may backpropagate through the network, and may apply an optimizer that may include momentum, adaptive moments, or a schedule with warmup and decay. When a stochastic gradient Markov method may be enabled, update steps may incorporate calibrated noise into parameter updates so that iterates may approximate draws from a posterior over parameters; the module 17 may set the noise scale from the mini-batch size and a temperature parameter and may reduce or increase the scale over time under a schedule recorded with the run metadata. The module 17 may support variational inference by maintaining means and covariances for a distribution over inducing-point values, may compute gradients of an evidence lower bound, and may optionally apply natural-gradient or coordinate updates to variational blocks before returning to the outer optimizer. The module 17 may track training and validation metrics including negative log likelihood, calibration error, accuracy, effective sample counts for variational parameters, and gradient statistics keyed by layer, and may attach these measurements to checkpoints.

In some embodiments, a sampling phase may draw hyperparameters and, when configured, inducing-point variables from their posteriors. The module 17 may allocate chains across devices, may initialize each chain from the current point estimate or a nearby perturbation, and may step each chain using a selected transition rule such as a gradient-informed proposal, a slice step, or a random-walk proposal with adaptive scaling. The module 17 may compute convergence diagnostics including a Gelman-Rubin statistic and an effective sample size estimate on sliding windows, and may terminate or extend chains on a per-parameter basis according to thresholds. The module 17 may maintain a hierarchy in which global kernel-amplitude and noise parameters may be sampled first, followed by length-scale groups, and then any class-specific parameters, and may condition proposals at each level on draws from higher levels. The module 17 may thin chains to reduce autocorrelation, may store draws in a ring buffer with checksums, and may expose a sampler-state snapshot so that subsequent sessions may warm-start from a previous endpoint.

In some embodiments, the module 17 may reduce sampling cost by applying quasi-Monte Carlo and variance-reduction procedures. For predictive averaging used during training or validation, the module 17 may generate low-discrepancy sequences in a base space, may transform those sequences to the target latent space using a reparameterization map that may depend on a stored factorization, and may pair draws with antithetic counterparts to cancel odd-order error terms. The module 17 may stratify draws by magnitude bands and may sample evenly across bands, and may apply a control-variate baseline formed from a deterministic transform of latent means so that the residual sampling variance may be smaller. The module 17 may adapt draw counts to reach stability tolerances on tracked summary metrics and may route difficult batches to a higher-fidelity path while keeping an overall budget by reducing draws on easier batches identified by a sensitivity scorer 18 operating in training mode.

In some embodiments, the module 17 may apply probabilistic regularization during training by sampling latent gating variables that may stochastically omit or scale connections or inducing-point contributions. The module 17 may draw gates per batch from a specified prior family, may apply the resulting mask to kernel or value computations when computing the training objective, and may backpropagate through a differentiable relaxation when required. The module 17 may log per-connection gate frequencies and may apply pruning passes that may remove units or inducing points whose gates may remain near zero under a defined window. The module 17 may further run inducing-point maintenance, in which the set of inducing locations may be scored against a reservoir of recent feature vectors, and may add, relocate, or remove inducing points to improve coverage, while updating cached factorizations used for fast prediction. The module 17 may coordinate these maintenance steps with the controller 15 so that inference services may switch to new parameter snapshots only after consistency checks may pass.

In some embodiments, the module 17 may support multi-output Gaussian process configurations and may select between independent per-class processes and joint processes with cross-class covariance. For independent processes, the module 17 may maintain separate variational or sampler states per class and may share inducing locations while storing class-specific variational means and covariances. For joint processes, the module 17 may maintain block-structured states and may update off-diagonal covariance blocks with low-rank parameterizations to control memory. The module 17 may support deep-kernel configurations by training a projection network in front of the Gaussian process layer 32 and may normalize projected vectors to a configured range before kernel evaluation. The module 17 may optionally train a heteroscedastic noise head that may output per-input noise estimates, and may include a step to calibrate noise head outputs against held-out data before including them in predictive dispersion during validation.

In some embodiments, the module 17 may coordinate with a mode selector 20 and a sensitivity scorer 18 to apply feedback from inference to training. The module 17 may receive streams that may summarize inputs with high uncertainty, disagreement across probabilistic heads, or rising latency, and may allocate additional draws or parameter updates to batches drawn from these streams. The module 17 may compute acquisition scores based on predicted uncertainty, label availability, or tenant-provided priorities, and may select records for future annotation or reweighting. The module 17 may update sensitivity thresholds used at inference by analyzing recent calibration metrics and may write those thresholds to a configuration store, where the controller 15 may pick them up and route future requests accordingly.

In some embodiments, the module 17 may support alternative training variants that may produce similar outputs without maintaining a full Gaussian process posterior. A Bayesian linear head variant may maintain a posterior over linear weights on top of transformer features and may update that posterior with stochastic gradient Markov methods or variational updates; the module 17 may record weight draws and may export them to the likelihood and marginalization module 34 for predictive averaging. A deep-ensemble variant may train multiple deterministic heads from different initial conditions, may checkpoint each head separately, and may aggregate logits and spreads across heads; the module 17 may balance data shards across heads and may track per-head calibration. A Monte Carlo dropout variant may keep a single deterministic head, may apply dropout at training and test time, and may record seed streams so that repeated predictive passes may be reproducible; the module 17 may schedule test-time passes during validation to produce uncertainty summaries. A Laplace-approximation variant may fit a second-order approximation around a trained head and may derive a Gaussian approximation over weights; the module 17 may compute curvature information with a block-diagonal or low-rank approximation and may export the approximation parameters for use during predictive marginalization.

In some embodiments, the module 17 may implement rigorous checkpointing and reproducibility procedures. The module 17 may assign monotonically increasing version identifiers to parameter snapshots, may store optimizer states, sampler states, and random number generator seeds with each snapshot, and may write manifest files that may list configuration hashes, vocabulary and positional encoding versions, and training data slices. The module 17 may expose atomic snapshot handoff by writing new snapshots to a staging location, running an integrity check, and then updating a pointer consumed by inference services. The module 17 may support rollbacks by retaining a window of previous snapshots, and may support canary deployments by stamping tenant allow-lists so that only selected tenants may receive new snapshots until metrics may indicate stability.

In some embodiments, the module 17 may be designed for distributed execution. The module 17 may shard training batches across accelerator devices, may run all-reduce operations to aggregate gradients and sampler statistics, and may synchronize variational parameters or sampler hyperparameters at configurable intervals. The module 17 may run chains on separate workers and may merge draws when computing validation metrics, and may route heavyweight updates such as inducing-point relocation to off-peak windows coordinated by the controller 15. The module 17 may compress communication by quantizing gradient and sampler messages and may apply error compensation to maintain accuracy. The module 17 may expose a monitoring interface that may stream metrics and sample traces to the user interface module 22 for inspection by a tenant.

In some embodiments, the module 17 may enforce policy and security constraints during training. The module 17 may honor tenant-scoped parameter sets, may isolate data and parameter states by tenant identifiers, and may rotate signing keys and access tokens when writing and reading parameter snapshots from storage. The module 17 may apply differential privacy procedures when configured by adding calibrated noise to gradients and clipping per-record contributions prior to aggregation, and may report privacy budget usage in the snapshot manifest. The module 17 may redact or hash sensitive tokens during logging, may throttle sampling when resource limits may be reached, and may record audit trails of major actions including sampler starts and stops, inducing-point updates, and snapshot activations.

In some embodiments, a sensitivity scorer 18 may accept, as inputs, per-token hidden representations emitted by a transformer encoder 30, a sequence-level feature vector, attention masks, and outputs from a probabilistic head that may include latent means, latent variances, and hyperparameter samples from a Gaussian process layer 32. The output sensitivity score may be a single number that indicates, roughly "how much would the model's answer change if this part of the input changed a little?" The system may compute one score for each input token or for groups of tokens (like a sentence, a field in a form, or a section of code). Scores near "low" may mean the output would barely move if that part changed; scores near "high" may mean that part is influential.

To compute the score in some embodiments, the sensitivity scorer 18 takes inputs it already has during inference: the token representations coming out of the transformer, the model's current predicted probabilities, and the uncertainty signals from the Gaussian-process head. Then it runs a quick test to estimate influence. That test can be done a few ways: tiny "what-if" nudges to the token vectors and measuring how the predicted probabilities shift; using the model's gradients as a shortcut for those nudges; or reading uncertainty directly from the probabilistic head and attributing it back to tokens or groups. The raw influences may scaled into comparable scores, smoothed over neighboring tokens, and collected into per-token and per-group numbers the rest of the system 12 can use.

These scores are expected useful because they tell the system where to spend effort. High-sensitivity regions can be routed to a more careful path (for example, do extra sampling before deciding), while low-sensitivity regions can take the faster path. The scores may also power simple explanations (e.g., heatmaps over the text showing which parts mattered most) and they may help with data curation by flagging inputs where the model seems touchy or uncertain so those can be reviewed or prioritized for labeling.

The sensitivity scorer 18 may also accept a target specification that may identify which output quantity to attribute, such as a selected class probability, a vector of class probabilities, a scalar uncertainty summary, or a composite that may combine both probability and uncertainty terms. The sensitivity scorer 18 may construct a working copy of the forward state for the current request, may select the target quantity, and may initialize buffers sized to the token length or to predefined groups of tokens supplied by configuration or by a grouping service.

In some embodiments, a first class of procedures may estimate per-token influence by applying small perturbations to token-level inputs and measuring the corresponding change in the target quantity. The sensitivity scorer 18 may generate a perturbation plan that may identify which tokens to nudge, the magnitude of each nudge expressed relative to the scale of the token embeddings, and whether perturbations may be applied as additive noise, as masked substitutions with a neutral token, or as controlled rewrites drawn from a small synonym table. The sensitivity scorer 18 may apply each perturbation while holding all other tokens fixed, may re-run the forward path through the transformer encoder 30 and the probabilistic head, and may record the change in the target quantity relative to the unperturbed run. The sensitivity scorer 18 may repeat these steps for each token and may optionally apply bidirectional nudges to improve symmetry before aggregating the recorded changes into a raw sensitivity value per token.

In some embodiments, a second class of procedures may estimate influence by reading gradients of the target quantity with respect to intermediate representations, which may reduce the number of forward evaluations. The sensitivity scorer 18 may mark the target quantity for differentiation, may back-propagate through the probabilistic head and the transformer encoder 30 to obtain a gradient tensor aligned to the token sequence, and may compress the gradient at each position into a scalar by applying a norm over channels or by taking a signed projection onto the corresponding token embedding. The sensitivity scorer 18 may combine gradient information with the original token representation by computing a path-based accumulation that may sample intermediate points between a baseline representation and the current representation and may average the per-sample gradients before scalar reduction. The sensitivity scorer 18 may normalize the resulting scalars across positions and may record them as per-token sensitivity values.

In some embodiments, a third class of procedures may attribute uncertainty returned by the probabilistic head back to tokens or groups by decomposing variance across controlled experiments. The sensitivity scorer 18 may hold the transformer encoder 30 state fixed, may request multiple draws of latent quantities or hyperparameters from the Gaussian process layer 32, and may compute for each draw the target uncertainty quantity. The sensitivity scorer 18 may then apply token-level masks that may neutralize or clamp a subset of token contributions, may recompute the uncertainty quantity under those masks, and may record the change as the contribution of the masked subset. The sensitivity scorer 18 may enumerate single-token masks and multi-token masks based on a sampling plan and may aggregate recorded changes into per-token and per-group uncertainty attributions that may sum, up to approximation error, to the total uncertainty.

In some embodiments, multi-level feature grouping may be applied before scoring so that related tokens may share a single sensitivity index. The sensitivity scorer 18 may receive grouping directives that may define groups such as linguistic constructs, semantic clusters, code blocks, or form fields, and may roll up token-level representations into group descriptors by averaging or by applying a small attention pooling per group. The sensitivity scorer 18 may run any of the perturbation-based, gradient-based, or uncertainty-decomposition procedures on the group descriptors by muting or nudging entire groups at once, and may record group scores alongside token scores. The sensitivity scorer 18 may maintain a mapping between tokens and groups so that group scores may be broadcast back to tokens for display or for routing decisions.

In some embodiments, the sensitivity scorer 18 may implement variance-based sensitivity analysis using low-discrepancy sampling to reduce the number of model evaluations. The sensitivity scorer 18 may define an input subspace formed by token-level or group-level factors, may sample factor settings using a sequence that may evenly cover the subspace, and may evaluate the target quantity under each sampled setting while reusing cached intermediate results where allowed. The sensitivity scorer 18 may accumulate contributions that correspond to main effects and interaction effects by combining evaluations that share factor settings, and may scale the contributions so that the accumulated effects approximate the variance of the target quantity across the sampled subspace. The sensitivity scorer 18 may limit the subspace to the most influential factors based on preliminary gradients or perturbation magnitudes to control evaluation cost.

In some embodiments, attention-informed procedures may propagate importance through the transformer encoder 30's attention structure to derive sensitivity signals without additional forward passes. The sensitivity scorer 18 may read stored attention weights for each head and layer, may collapse the weights across heads with a head-importance weighting, and may multiply the collapsed weights across layers to compute how much information from each source position may reach a sink position associated with the sequence-level feature vector. The sensitivity scorer 18 may combine this propagation result with a sink-side gradient or with a change in the target quantity measured at the sink to form a token-level importance value. The sensitivity scorer 18 may clamp or rescale contributions according to masks that reflect restricted attention patterns so that scores remain consistent with causal or segment boundaries.

In some embodiments, the sensitivity scorer 18 may perform topological aggregation before or after computing raw scores to expose neighborhoods of related tokens. The sensitivity scorer 18 may construct a graph whose nodes may correspond to tokens or groups, with edges that may reflect semantic similarity, co-attention strength, or proximity, and may cluster the graph into neighborhoods using a selected clustering routine. The sensitivity scorer 18 may sum or average raw scores within each neighborhood and may attribute interaction terms to edges proportional to measures of interdependence observed during perturbation or sampling. The sensitivity scorer 18 may output both per-node scores and per-neighborhood aggregates together with edge annotations that may record inter-neighborhood influence.

In some embodiments, the sensitivity scorer 18 may operate in a streaming mode that may compute preliminary scores as soon as the transformer encoder 30 emits early-layer states, and may refine the scores as deeper-layer states become available. The sensitivity scorer 18 may budget computation by first emitting a coarse gradient-based score, may request a small number of perturbation evaluations for positions whose coarse scores exceed a threshold, and may defer uncertainty-decomposition runs to a later phase if the controller 15 directs additional processing. The sensitivity scorer 18 may track stability by measuring how much scores change across refinement steps and may increase or decrease budgets accordingly under a policy maintained by the controller 15.

In some embodiments, the sensitivity scorer 18 may include calibration and normalization steps that may prepare scores for downstream consumption. The sensitivity scorer 18 may apply token-length normalization so that longer sequences do not systematically receive lower per-token scores, may scale scores into a configured numeric range, and may smooth scores across neighboring tokens with a short window or with a learned filter to reduce isolated spikes. The sensitivity scorer 18 may clip extreme values to a configured bound, may record the clipping rate, and may write per-request calibration metadata such as running means and variances used for normalization so that scores may be compared across requests.

In some embodiments, the sensitivity scorer 18 may support alternative formulations that may not require gradients or repeated full forward passes. The sensitivity scorer 18 may approximate influence using a local linear model fit at the sequence-level feature vector by sampling a small number of synthetic feature perturbations and regressing the target quantity onto those perturbations; the resulting coefficients may be projected back to tokens using the pooling weights or by solving a small reconstruction problem. The sensitivity scorer 18 may read internal gates or masks from mixture-of-experts components or structured-sparse attention components and may treat those gates as importance weights that may be combined with token activations to form a score without additional evaluations. The sensitivity scorer 18 may also approximate sensitivity by computing per-token contribution to a loss surrogate built from cached logits and uncertainty summaries and by comparing the surrogate under neutralized and active token states.

In some embodiments, the sensitivity scorer 18 may emit a structured output record that may include per-token scores, per-group scores, optional neighborhood aggregates, and diagnostics for the procedure used. The record may list the scoring mode, the number of perturbations or draws performed, gradient ranges, normalization parameters, and any masks applied. The sensitivity scorer 18 may attach provenance fields that may reference the model version, the transformer encoder 30 block indices used for attention-informed procedures, and the Gaussian process layer 32 identifiers used for uncertainty-decomposition procedures. The record may be written to storage, may be passed to a mode selector 20, and may be provided to a user interface module 22 for later rendering without restricting how the scores may be used by other components.

In some embodiments, the sensitivity scorer 18 may implement safeguards and resource controls. The sensitivity scorer 18 may bound the number of perturbation evaluations per request, may share cached intermediate tensors across token perturbations to reduce repeated work, and may parallelize independent evaluations on a graphics processing unit device or across worker processes. The sensitivity scorer 18 may redact or obfuscate token content when writing logs, may respect tenant-specific policies that restrict which procedures may be applied, and may add calibrated noise to scores when a privacy mode may be configured. The sensitivity scorer 18 may monitor runtime metrics, may back off to gradient-only procedures when resource limits may be reached, and may resume higher-cost procedures when budgets may be reset by the controller 15.

In some embodiments, the sensitivity scorer 18 may emit a structured record that may include per-token scores aligned to the original sequence, optional group scores, and diagnostics; for example, given tokens [CLS], "reset", "my", "password", ",", "please", [SEP], the scorer 18 may return per-token sensitivities such as [0.00, 0.62, 0.08, 0.71, 0.03, 0.21, 0.00] on a zero-to-one scale where [CLS] and [SEP] may be fixed at zero, together with group scores such as {"intent_terms": 0.74 for {"reset", "password"}, "politeness_markers": 0.21 for {",", "please"}} and an uncertainty-attribution vector such as [0.00, 0.38, 0.04, 0.42, 0.01, 0.09, 0.00] that may represent the proportion of predictive variance attributed to each token under the selected procedure; the record may carry the attention mask [1, 1, 1, 1, 1, 1, 1], the scoring mode identifier (for example, "gradients+perturbation"), the number of perturbations or latent draws performed (for example, 16), normalization parameters used for scaling, and provenance fields such as model version and transformer block indices consulted, and may be serialized for routing to the mode selector 20 and for rendering by the user interface module 22.

In some embodiments, a mode selector 20 may receive, for each request, a compact context record assembled by the controller 15 that may include preliminary class probabilities from the likelihood and marginalization module 34 when available, scalar or vector uncertainty summaries derived from outputs of the Gaussian process layer 32, per-token and per-group sensitivity scores from the sensitivity scorer 18, and operational constraints such as latency budget, maximum sampling budget, and tenant policy flags. The mode selector 20, in some embodiments, can be thought of as a traffic cop for compute. It may look at quick signals (like the model's current confidence, the uncertainty from the Gaussian-process head, and the sensitivity scores over the input) and decide whether to take a fast lane or a careful lane. Inputs may include: the preliminary class probabilities, an uncertainty number (how unsure the model is), token/group sensitivity scores, and simple context like request size or latency budget. Using a rules or thresholds, selector 20 may output a directive such as "use the deterministic path" (e.g., one clean pass with fixed settings) or "use the Bayesian path" (e.g., do extra sampling and averaging). In some embodiments, selector 20 sends that directive back to the controller 15, which then runs the AI model 16 in the chosen mode and forwards the final results to the user interface module 22.

An expected advantage is that, in some embodiments, the system spends effort where it matters. If the input looks familiar and low-risk, the mode selector 20 keeps things fast. If the input looks unusual or important, selector 20 may ask the system to slow down and gather more evidence before deciding. Over time, selector 20 may also update its thresholds based on feedback (e.g., if many "fast" cases later turn out to be tricky, it will become more cautious for similar inputs). In short: the mode selector 20 in some embodiments reads quick signals from elsewhere in the AI system 12, chooses the evaluation style, and helps balance speed and reliability without changing the underlying model.

To these ends or others, the mode selector 20 may validate the context record, may impute defaults for missing fields, and may normalize inputs to reference scales recorded with the active model version. The mode selector 20 may then compute feature values used for decision making, which may include aggregates over sensitivity scores, dispersion statistics over candidate class probabilities, and simple counters such as sequence length or proportion of masked tokens. The mode selector 20 may apply guard rules that may immediately direct a deterministic path when inputs violate resource limits, may direct a higher-fidelity Bayesian path when any safety flag may be present, or may defer to a learned policy otherwise.

In some embodiments, a rules-based policy may be implemented as a sequence of threshold comparisons and branching operations. The mode selector 20 may compare a predictive entropy against a configured boundary, may evaluate whether the maximum class probability falls below a confidence threshold, and may inspect whether any group sensitivity score exceeds a per-tenant ceiling that may indicate the presence of influential content. The mode selector 20 may compute a routing score as a weighted combination of these features, where the weights may be loaded from configuration, and may select among modes such as deterministic evaluation, low-budget sampling, or high-budget sampling based on score intervals. The mode selector 20 may record the feature vector, thresholds used, and the final directive in a decision log, may attach a monotonic decision identifier to the request, and may emit the directive to the controller 15 together with numeric budgets such as the number of latent draws, the number of hyperparameter draws, and any limits on structured sparse attention reconfiguration.

In some embodiments, a learned policy may be used in place of fixed rules. The mode selector 20 may load a compact model such as a gradient-boosted tree, a small multilayer perceptron, or a linear classifier trained over historical features and outcomes. The learned policy may accept the same feature vector described above and may output a mode label and budgets. The mode selector 20 may calibrate the learned policy scores against holdout data by applying a monotone mapping stored in configuration so that a policy score may be interpreted consistently across model versions. The mode selector 20 may support bandit-style exploration by randomizing among near-tie actions at a configured low rate, and may write action and outcome tuples to a buffered log that the controller 15 may export for offline policy retraining. The mode selector 20 may also maintain per-tenant overlays so that a default global policy may be adjusted by tenant-specific constraints, including caps on compute or stricter routing to deterministic paths for certain request classes.

In some embodiments, the mode selector 20 may support multi-stage decisions. A preliminary decision may be made after the transformer encoder 30 emits early-layer summaries, which may authorize a provisional deterministic path or a low-budget sampling pass, and a final decision may be made after the Gaussian process layer 32 returns updated uncertainty metrics, which may escalate the budget when a stability check fails. The mode selector 20 may implement stability checks by comparing partial aggregates from the likelihood and marginalization module 34 across successive batches of samples and may increase or decrease budgets to meet a target tolerance recorded with the run configuration. The mode selector 20 may also request refinement of sensitivity scores at selected spans before committing to a high-budget path by instructing the sensitivity scorer 18 to run a small set of perturbation evaluations on tokens whose gradient-based scores cross a boundary.

In some embodiments, the mode selector 20 may enforce resource governance. The mode selector 20 may maintain per-tenant and global counters for sampled draws, GPU-seconds, memory reservations, and concurrent Bayesian jobs. Before emitting a directive, the mode selector 20 may check these counters and may downgrade the requested budgets when limits are near exhaustion, while marking the decision with a resource-constrained flag for audit. The mode selector 20 may coordinate with the controller 15 to queue deferred high-budget actions for later execution or to split them into partial passes with intermediate results returned to the user interface module 22. The mode selector 20 may periodically refresh limits and policy parameters from a configuration store and may roll over counters at time windows defined by tenant contracts.

In some embodiments, alternative implementations may delegate the decision to a rules engine maintained outside the runtime. The mode selector 20 may serialize the feature vector and policy context to a declarative representation, may call an external policy evaluation service, and may receive a decision and budgets encoded as a compact payload. In another variant, the mode selector 20 may embed the decision inside the likelihood and marginalization module 34 so that sampling budgets may adapt internally as partial results arrive, and the mode selector 20 may act as a recorder that publishes the final chosen budgets and any escalations performed. In yet another variant, the mode selector 20 may be integrated with the sensitivity scorer 18 so that token- or group-level routing may be supported; for example, the mode selector 20 may instruct structured sparse attention in selected transformer blocks to switch to higher-capacity experts for spans whose sensitivity exceeds a threshold while leaving other spans in a low-capacity path, and may propagate these choices as per-layer masks back to the controller 15.

In some embodiments, the mode selector 20 may implement feedback and calibration procedures. After the controller 15 finalizes a response, the mode selector 20 may receive outcome summaries such as latency consumed, sample counts used, calibration error on held-out traces when available, and user override signals collected by the user interface module 22. The mode selector 20 may adjust thresholds by small increments based on moving averages, may update exploration rates within allowed bands, and may write a compact state record that the controller 15 may checkpoint with the model version so that a deployment may be rolled back with policy state preserved. The mode selector 20 may expose a dry-run mode in which it computes and logs what it would have chosen while deferring to a fixed baseline directive, which may support A/B comparisons orchestrated by the controller 15 without affecting live routing.

In some embodiments, a user interface (UI) module 22 may execute as a set of services and client libraries that may prepare, serialize, and present outputs produced by the AI system 12 to user devices 14. The UI module 22 may accept response records from the controller 15 that may include predicted class probabilities, uncertainty values, sensitivity scores, and provenance metadata such as model version, configuration identifiers, and sampling budgets actually consumed. The UI module 22 may construct view models by transforming raw arrays into typed objects, may compute derived values such as normalized scales and percentile ranks, and may attach presentation hints that may specify color ramps, threshold markers, and annotation labels. The UI module 22 may render these view models to one or more front ends, which may include a standards-compliant web application running in a browser, native applications, and an API client that may request pre-rendered images or structured data for embedding into third-party dashboards or use in other logic.

In some embodiments, the UI module 22 may present a classification view that may display predicted class probabilities as stacked bars or sorted lists, with each class row showing a probability, a confidence band derived from predictive dispersion, and a compact badge indicating routing mode selected by the mode selector 20. The view may include an uncertainty panel that may present predictive entropy as a single scalar, a mutual-information-style value when available, and a trend sparkline across successive requests for recurring inputs. A token-level explanation view may apply a heatmap overlay to the original text, where per-token sensitivity scores may be mapped to an opacity or color scale, and hovering or selecting a span may display exact numeric values and the procedure used to compute the scores. A variance-attribution view may display grouped sensitivities for linguistic constructs or field groups as treemaps or bar clusters and may include controls to expand or collapse groups and to switch the attribution target among a selected class probability, a vector of class probabilities, or a scalar uncertainty summary.

In some embodiments, the UI module 22 may present topological variance visualizations and diagnostic graphs. A graph view may render feature groups as nodes positioned by a force-directed layout, may draw edges whose thickness may represent interaction strength, and may color nodes by variance attribution level; selecting a node may filter the token heatmap to the tokens associated with that group and may reveal the set of inducing points from the Gaussian process layer 32 that contributed the most to the current prediction. A timeline view may show partial aggregates from the likelihood and marginalization module 34 as sampling progresses, with bands narrowing as additional draws may be incorporated. The view may allow pausing, resuming, and stepping to inspect intermediate probability vectors. A calibration view may plot predicted probabilities against observed outcomes for labeled validation sets when provided, and may display temperature or link-function parameters active for a tenant in the current snapshot.

In some embodiments, the UI module 22 may support interactive workflows for review and what-if analysis. A reviewer may select a token span and request a counterfactual evaluation; the UI module 22 may submit a perturbation plan to the controller 15, may display the resulting change in predicted probabilities and uncertainty, and may annotate the difference on the heatmap. A user may switch inference modes for a single request by instructing the controller 15 to re-run with a higher budget. The UI module 22 may display both the original and re-run outputs side-by-side with a diff of probabilities and a change log of sampling counts. For multi-tenant deployments, the UI module 22 may allow a user to switch tenant context, which may adjust class taxonomies, masking policies, and visualization defaults. The module 22 may apply tenant-scoped themes and may restrict access to artifacts and logs according to tenant identifiers. For automated clients, the UI module 22 may provide endpoints that may return the same view models in JSON or binary form along with signed URLs (uniform resource locators) for pre-rendered heatmaps and graphs.

In some embodiments, the UI module 22 may manage rendering pipelines and performance controls. The UI module 22 may downsample long sequences for initial display and may fetch high-resolution segments on demand as a user scrolls or focuses on a region. The UI module 22 may compress numeric arrays with quantization and run-length encoding before transmission, may apply client-side decompression, and may cache immutable artifacts by content hash to avoid redundant downloads. The UI module 22 may stream partial results for long-running evaluations by emitting incremental probability vectors and uncertainty updates framed with sequence numbers, and the front end may animate transitions while preserving axis scales. The UI module 22 may record interaction telemetry such as filter selections, drill-downs, and mode overrides, and may write that telemetry to storage where the controller 15 may aggregate it for later policy adjustments by the mode selector 20.

Figure 2:
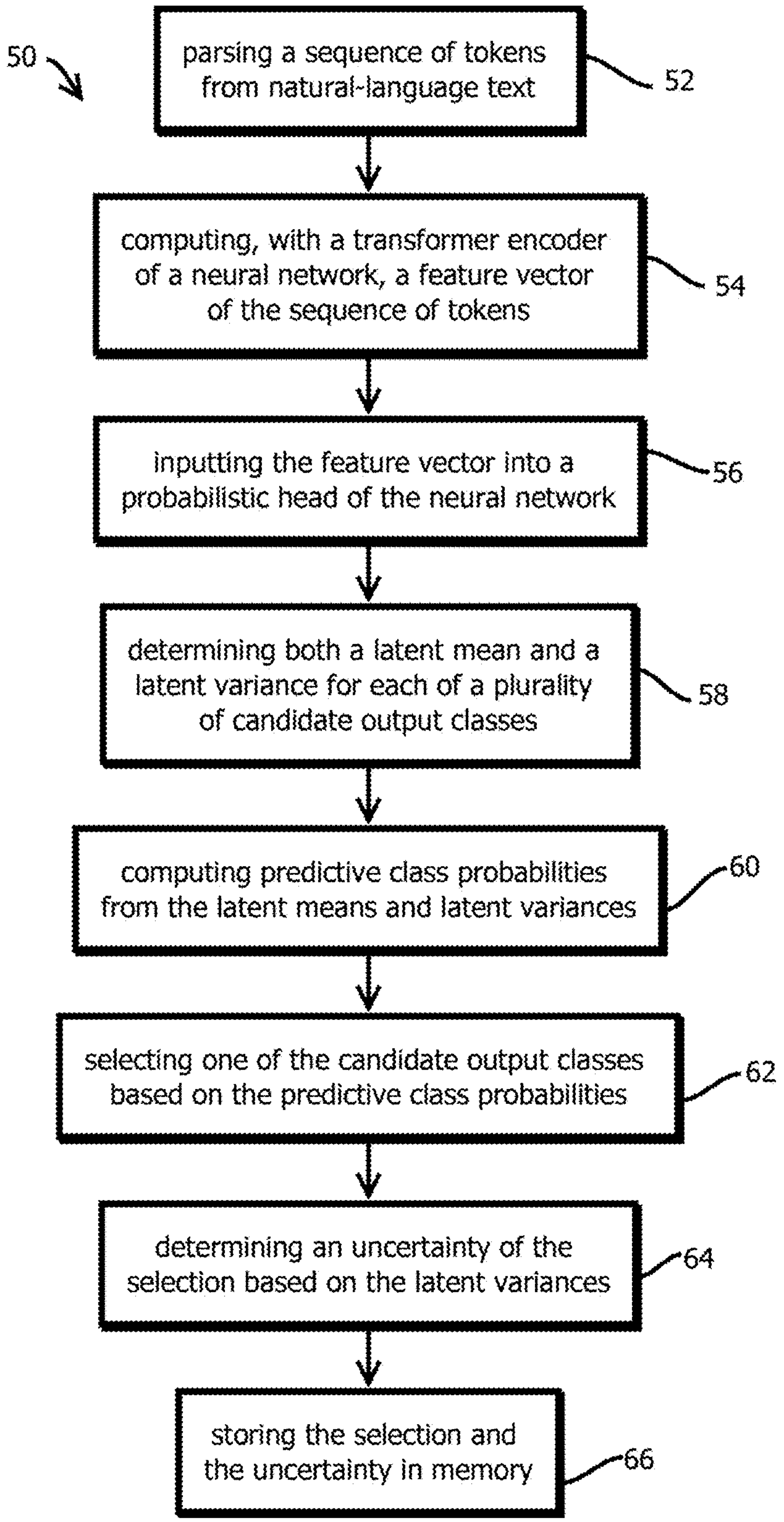
FIG. 2 is a flow chart depicting an example of a process that may be executed by the AI system of FIG. 1 in accordance with some embodiments of the present techniques.

Some embodiments may implement a process 50 illustrated in FIG. 2, for instance with the above described AI system 12 or with other implementations. Some embodiments include parsing a sequence of tokens from natural language text (or other unstructured inputs), as indicated by block 52. Some embodiments include computing with a transformer encoder of a neural network a feature vector of the sequence of tokens, as indicated by block 54. Some embodiments input the feature vector into a probabilistic head of the neural network, as indicated by block 56. Embodiments may determine both a latent mean and a latent variance for each of a plurality of candidate output classes, as indicated by block 58. Some embodiments may compute predictive class probabilities from the latent means and latent variances, as indicated by block 60. Embodiments may select one of the candidate output classes based on the predictive class probabilities, as indicated by block 62. Some embodiments determine an uncertainty of the selection based on the latent variances, as indicated by block 64. Some embodiments store the selection and the uncertainty in memory, as indicated by block 66, before presenting those values to a user device requesting the inference or prediction.

Figure 3:
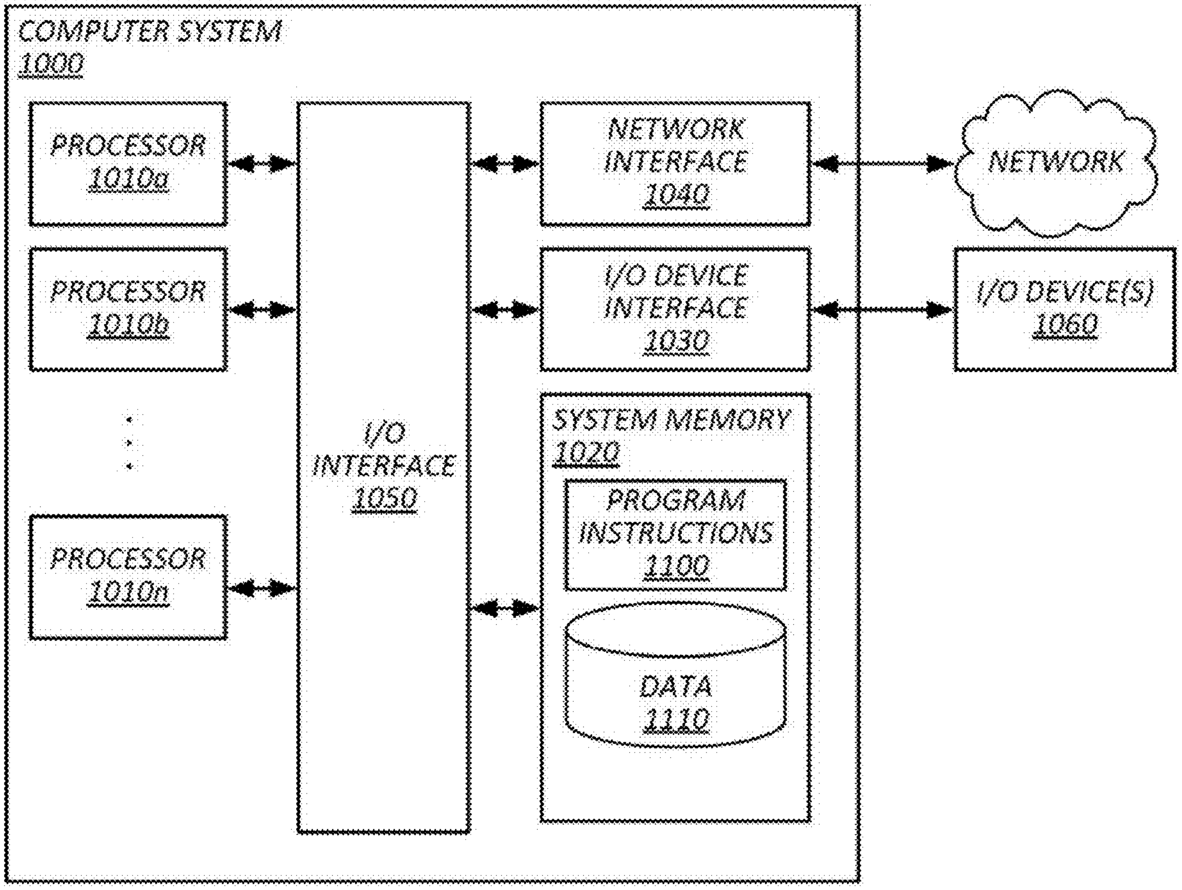
FIG. 3 is an example of a computing device by which the above mentioned processes and systems may be implemented.

FIG. 3 is a diagram that illustrates an exemplary computing device 1000 that may be used to construct computing systems by which the above techniques are implemented. A single computing device is shown, but some embodiments of a computer system may include multiple computing devices that communicate over a network, for instance in the course of collectively executing various parts of a distributed application. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

Embodiment 1. A tangible, non-transitory, machine-readable medium storing instructions that, when executed, effectuate operations comprising: parsing, with a computer system, a sequence of tokens from natural-language text; computing, with the computer system, with a transformer encoder of a neural network, a feature vector of the sequence of tokens; inputting, with the computer system, the feature vector into a probabilistic head of the neural network comprising a Gaussian-process layer and determining, with the probabilistic head, both a latent mean and a latent variance for each of a plurality of candidate output classes; computing, with the computer system, predictive class probabilities from the latent means and latent variances; selecting, with the computer system, one of the candidate output classes based on the predictive class probabilities; determining, with the computer system, an uncertainty of the selection based on the latent variances; and storing, with the computer system, the selection and the uncertainty in memory.

Embodiment 2. The medium of embodiment 1, wherein determining the uncertainty comprises computing predictive entropy over the candidate output classes.

Embodiment 3. The medium of embodiment 1, wherein the Gaussian-process layer is a sparse variational Gaussian process with learned inducing points and an automatic relevance determination kernel.

Embodiment 4. The medium of embodiment 1, wherein computing the predictive class probabilities comprises sampling from a Gaussian-process predictive distribution and applying a softmax to obtain Monte Carlo estimates of the predictive class probabilities.

Embodiment 5. The medium of embodiment 1, wherein the feature vector is obtained by pooling hidden states of a final layer of the transformer encoder.

Embodiment 6. The medium of embodiment 1, further comprising, during operation of the transformer encoder, determining a per-token or per-segment uncertainty signal and applying structured sparse attention that selects a subset of keys, values, or both based at least in part on the uncertainty signal to prioritize tokens or segments associated with estimated variance exceeding a threshold.

Embodiment 7. The medium of embodiment 6, wherein the uncertainty signal is determined based on at least one of: latent variances output by the probabilistic head for intermediate representations of the transformer encoder; an auxiliary uncertainty estimator trained to predict variance; or a proxy metric correlated with uncertainty.

Embodiment 8. The medium of embodiment 6, wherein the structured sparse attention comprises one or more of: top-k routing by uncertainty rank; block-sparse attention with blocks selected by aggregated uncertainty; learnable attention masks gated by uncertainty thresholds; or mixture-of-experts routing in which higher-uncertainty tokens are routed to expert models with a higher compute budget relative to expert models with a lower compute budget to which lower-uncertainty tokens are routed.

Embodiment 9. The medium of embodiment 6, further comprising iteratively updating the uncertainty signal across layers of the neural network and reconfiguring the structured sparse attention for different layers of the neural network.

Embodiment 10. The medium of embodiment 1, further comprising performing Markov chain Monte Carlo sampling over at least some Gaussian-process hyperparameters with an adaptive chain length that is terminated on a per-parameter basis upon satisfaction of a convergence criterion.

Embodiment 11. The medium of embodiment 10, wherein the Markov chain Monte Carlo sampling is hierarchical and comprises sampling one or more global or structural hyperparameters of the Gaussian-process layer prior to sampling lower-level hyperparameters conditioned on the sampled global or structural hyperparameters.

Embodiment 12. The medium of embodiment 10, wherein computing the predictive class probabilities and the uncertainty comprises marginalizing over a posterior distribution of the Gaussian-process hyperparameters obtained via the Markov chain Monte Carlo sampling by drawing a plurality of hyperparameter samples and performing Monte Carlo integration.

Embodiment 13. The medium of embodiment 1, further comprising training the probabilistic head with a hybrid Bayesian optimization that interleaves stochastic gradient-based Bayesian inference using mini-batches with Markov chain Monte Carlo updates of Gaussian-process hyperparameters.

Embodiment 14. The medium of embodiment 1, wherein training the Gaussian-process layer comprises probabilistic dropout regularization with steps comprising: assigning, to a plurality of weights, activations, or inducing-point connections, latent gating variables governed by a prior distribution; for each training batch, sampling the gating variables to produce a binary or continuous mask; applying the mask to corresponding weights, activations, or kernel contributions to stochastically omit or scale them during forward and backward passes; computing a training objective as an expectation over the gating variables, approximated by Monte Carlo sampling or a differentiable relaxation; and, when performing Bayesian inference, marginalizing the gating variables or sampling the gating variables jointly with model parameters so that likelihood and posterior evaluations are taken over multiple masked subnetworks.

Embodiment 15. The medium of embodiment 1, further comprising applying Sobol sensitivity analysis with multi-level feature grouping to attribute portions of predictive variance to individual input features and to aggregated groups of input features, the groups comprising at least one of linguistic constructs, semantic clusters, syntactic patterns, or combinations thereof.

Embodiment 16. The medium of embodiment 1, further comprising generating a variance-attribution visualization that maps Sobol sensitivity results to a heatmap in which input feature groups and interaction effects are displayed at multiple sensitivity levels to explain contributions to the uncertainty.

Embodiment 17. The medium of embodiment 1, further comprising, during operation of the transformer encoder and the probabilistic head, determining a sensitivity score for at least one of tokens of the sequence of tokens or groups of features based on the tokens; comparing the sensitivity score to a sensitivity threshold; and selecting an inference mode from among first and second inference modes based on a result of the comparison.

Embodiment 18. The medium of embodiment 17, wherein the first inference mode comprises Bayesian inference, and the second inference mode comprises deterministic inference that evaluates the probabilistic head with fixed parameters without sampling.

Embodiment 19. The medium of embodiment 1, wherein: the parsing comprises subword tokenization with an attention mask and positional encodings; the transformer encoder comprises stacked layers that implement multi-head self-attention over query, key, and value projections with residual connections and layer normalization, and the feature vector is obtained by pooling hidden states of a final encoder layer using a classification token or mean pooling; the probabilistic head comprises a Gaussian-process layer over the feature vector with kernel-based covariance including an automatic-relevance-determination radial basis function kernel or a Matérn kernel, a learned set of inducing points, and a variational posterior defined by learned means and covariances at the inducing points; for each candidate output class the Gaussian-process layer defines a latent function that yields a posterior mean and a posterior variance; the predictive class probabilities are computed by marginalizing over the Gaussian-process predictive distribution under a non-Gaussian likelihood using sampling or moment matching and then normalizing with a softmax or probit mapping; and the uncertainty of the selection comprises at least one of predictive entropy over the predictive class probabilities or mutual information between a class label and parameters of the probabilistic head.

Embodiment 20. A tangible, non-transitory, machine-readable medium storing instructions that when executed by a data processing apparatus cause the data processing apparatus to perform operations comprising: any one of embodiments 1 through 19.

Embodiment 21. A system, comprising: one or more processors; and memory storing instructions that when executed by the processors cause the processors to effectuate operations comprising: any one of embodiments 1 through 19.

What is claimed is:

1. A tangible, non-transitory, machine-readable medium storing instructions that, when executed, effectuate operations comprising:

parsing, with a computer system, a sequence of tokens from natural-language text, wherein the parsing comprises subword tokenization used with an attention mask and positional encodings;

computing, with the computer system, with a transformer encoder of a neural network, a feature vector of the sequence of tokens, wherein the transformer encoder comprises stacked layers that implement multi-head self-attention over query, key, and value projections with residual connections and layer normalization, and the feature vector is obtained by pooling hidden states of an encoder layer;

inputting, with the computer system, the feature vector into a probabilistic head of the neural network comprising a Gaussian-process layer and determining, with the probabilistic head, both a latent mean and a latent variance for each of a plurality of candidate output classes, wherein for each candidate output class the Gaussian-process layer corresponds to a latent function that yields a posterior mean and a posterior variance;

computing, with the computer system, predictive class probabilities from the latent means and latent variances;

selecting, with the computer system, one of the candidate output classes based on the predictive class probabilities;

determining, with the computer system, an uncertainty of the selection based on the latent variances; and storing, with the computer system, the selection and the uncertainty in memory.

2. The medium of claim 1, wherein determining the uncertainty comprises computing predictive entropy over the candidate output classes.

3. The medium of claim 1, wherein the Gaussian-process layer is a sparse variational Gaussian process with learned inducing points and an automatic relevance determination kernel.

4. The medium of claim 1, wherein computing the predictive class probabilities comprises sampling from a Gaussian-process predictive distribution and applying a softmax to obtain Monte Carlo estimates of the predictive class probabilities.

5. The medium of claim 1, wherein the feature vector is obtained by pooling hidden states of a final layer of the transformer encoder.

6. The medium of claim 1, further comprising, during operation of the transformer encoder, determining a per-token or per-segment uncertainty signal and applying structured sparse attention that selects a subset of keys, values, or both based at least in part on the uncertainty signal to prioritize tokens or segments associated with estimated variance exceeding a threshold.

7. The medium of claim 6, wherein the uncertainty signal is determined based on at least one of:

latent variances output by the probabilistic head for intermediate representations of the transformer encoder;

an auxiliary uncertainty estimator trained to predict variance; or a proxy metric correlated with uncertainty.

8. The medium of claim 6, wherein the structured sparse attention comprises one or more of:

top-k routing by uncertainty rank;

block-sparse attention with blocks selected by aggregated uncertainty;

learnable attention masks gated by uncertainty thresholds; or mixture-of-experts routing in which higher-uncertainty tokens are routed to expert models with a higher compute budget relative to expert models with a lower compute budget to which lower-uncertainty tokens are routed.

9. The medium of claim 6, further comprising iteratively updating the uncertainty signal across layers of the neural network and reconfiguring the structured sparse attention for different layers of the neural network.

10. The medium of claim 1, further comprising performing Markov chain Monte Carlo sampling over at least some Gaussian-process hyperparameters with an adaptive chain length that is terminated on a per-parameter basis upon satisfaction of a convergence criterion.

11. The medium of claim 10, wherein the Markov chain Monte Carlo sampling is hierarchical and comprises sampling one or more global or structural hyperparameters of the Gaussian-process layer prior to sampling lower-level hyperparameters conditioned on the sampled global or structural hyperparameters.

12. The medium of claim 10, wherein computing the predictive class probabilities and the uncertainty comprises marginalizing over a posterior distribution of the Gaussian-process hyperparameters obtained via the Markov chain Monte Carlo sampling by drawing a plurality of hyperparameter samples and performing Monte Carlo integration.

13. The medium of claim 1, further comprising training the probabilistic head with a hybrid Bayesian optimization that interleaves stochastic gradient-based Bayesian inference using mini-batches with Markov chain Monte Carlo updates of Gaussian-process hyperparameters.

14. The medium of claim 1, wherein training the Gaussian-process layer comprises probabilistic dropout regularization with steps comprising:

assigning, to a plurality of weights, activations, or inducing-point connections, latent gating variables governed by a prior distribution;

for each training batch, sampling the gating variables to produce a binary or continuous mask;

applying the mask to corresponding weights, activations, or kernel contributions to stochastically omit or scale them during forward and backward passes;

computing a training objective as an expectation over the gating variables, approximated by Monte Carlo sampling or a differentiable relaxation; and when performing Bayesian inference, marginalizing the gating variables or sampling the gating variables jointly with model parameters so that likelihood and posterior evaluations are taken over multiple masked subnetworks.

15. The medium of claim 1, further comprising applying Sobol sensitivity analysis with multi-level feature grouping to attribute portions of predictive variance to individual input features and to aggregated groups of input features, the groups comprising at least one of linguistic constructs, semantic clusters, syntactic patterns, or combinations thereof.

16. The medium of claim 1, further comprising generating a variance-attribution visualization that maps Sobol sensitivity results to a heatmap in which input feature groups and interaction effects are displayed at multiple sensitivity levels to explain contributions to the uncertainty.

17. The medium of claim 1, further comprising:

during operation of the transformer encoder and the probabilistic head, determining a sensitivity score for at least one of tokens of the sequence of tokens or groups of features based on the tokens;

comparing the sensitivity score to a sensitivity threshold; and selecting an inference mode from among first and second inference modes based on a result of the comparison.

18. The medium of claim 17, wherein the first inference mode comprises Bayesian inference, and the second inference mode comprises deterministic inference that evaluates the probabilistic head with fixed parameters without sampling.

19. The medium of claim 1, wherein:

the probabilistic head applies kernel-based covariance including an automatic-relevance-determination radial basis function kernel or a Matérn kernel, a learned set of inducing points, and a variational posterior defined by learned means and covariances at the inducing points;

the predictive class probabilities are computed by marginalizing over the Gaussian-process predictive distribution under a non-Gaussian likelihood using sampling or moment matching and then normalizing with a softmax or probit mapping; and the uncertainty of the selection comprises at least one of predictive entropy over the predictive class probabilities or mutual information between a class label and parameters of the probabilistic head.

20. A method, comprising:

parsing, with a computer system, a sequence of tokens from natural-language text, wherein the parsing comprises subword tokenization used with an attention mask and positional encodings;

computing, with the computer system, with a transformer encoder of a neural network, a feature vector of the sequence of tokens, wherein the transformer encoder comprises stacked layers that implement multi-head self-attention over query, key, and value projections with residual connections and layer normalization, and the feature vector is obtained by pooling hidden states of an encoder layer;

inputting, with the computer system, the feature vector into a probabilistic head of the neural network comprising a Gaussian-process layer and determining, with the probabilistic head, both a latent mean and a latent variance for each of a plurality of candidate output classes, wherein for each candidate output class the Gaussian-process layer corresponds to a latent function that yields a posterior mean and a posterior variance;

computing, with the computer system, predictive class probabilities from the latent means and latent variances;

selecting, with the computer system, one of the candidate output classes based on the predictive class probabilities;

determining, with the computer system, an uncertainty of the selection based on the latent variances; and storing, with the computer system, the selection and the uncertainty in memory.

* * * * *